US012634130B2

(12) United States Patent
Eldefrawy et al.

(10) Patent No.: US 12,634,130 B2
(45) Date of Patent: May 19, 2026

(54) CERTIFICATE-BASED ENCRYPTION IMPLEMENTED WITH MULTIPLE ENCRYPTION SCHEMES

(71) Applicant: SRI International, Menlo Park, CA (US)

(72) Inventors: Karim Eldefrawy, Santa Monica, CA (US); Nicholas Genise, Austin, TX (US); Rutuja Kshirsagar, Blacksburg, VA (US)

(73) Assignee: SRI International, Menlo Park, CA (US)

( * ) Notice: Subject to any disclaimer, the term of this patent is extended or adjusted under 35 U.S.C. 154(b) by 234 days.

(21) Appl. No.: 18/208,627

(22) PCT Filed: Oct. 20, 2021

(86) PCT No.: PCT/US2021/055759
§ 371 (c)(1),
(2) Date: Jun. 12, 2023

(87) PCT Pub. No.: WO2022/125198
PCT Pub. Date: Jun. 16, 2022

(65) Prior Publication Data
US 2025/0086321 A1 Mar. 13, 2025

Related U.S. Application Data

(60) Provisional application No. 63/123,652, filed on Dec. 10, 2020.

(51) Int. Cl.
H04L 9/14 (2006.01)
H04L 9/40 (2022.01)
H04L 9/08 (2006.01)

(52) U.S. Cl.
CPC ............... H04L 9/14 (2013.01); H04L 63/045 (2013.01); H04L 9/0847 (2013.01)

(58) Field of Classification Search
CPC ........ H04L 9/14; H04L 9/0847; H04L 63/045
See application file for complete search history.

(56) References Cited

U.S. PATENT DOCUMENTS 7,961,879 B1 * 6/2011 Spies .................... H04L 9/3073
380/282
2005/0084100 A1 * 4/2005 Spies .................... H04L 9/3073
380/30

(Continued)

FOREIGN PATENT DOCUMENTS

WO 2020/242614 A1 12/2020

OTHER PUBLICATIONS

International Search Report and Written Opinion, PCT/US2021/55759 ISA:US, Jan. 25, 2022, 21 pp.

*Primary Examiner* — David J Pearson
(74) *Attorney, Agent, or Firm* — Rutan and Tucker, LLP

(57) ABSTRACT

An encryption module and the decryption module cooperate with an identity-based key generator of users in a communication system in order to use an identity-based and certificate-based construction using two or more encryption schemes. An encrypted message is communicated between users of the communication system such that the encrypted message received by the device of the user needs keys from each of the two or more encryption schemes to be able to decrypt the encrypted message. The validation module cooperates with a limited-time of validity certificate issued from a certificate authority platform to decrypt the encrypted message via the limited-time of validity certificate. The validation module allows the decryption module to decrypt the encrypted message with the limited-time of validity certificate corresponding to an identity of the user when the (Continued)

Figure 1A:
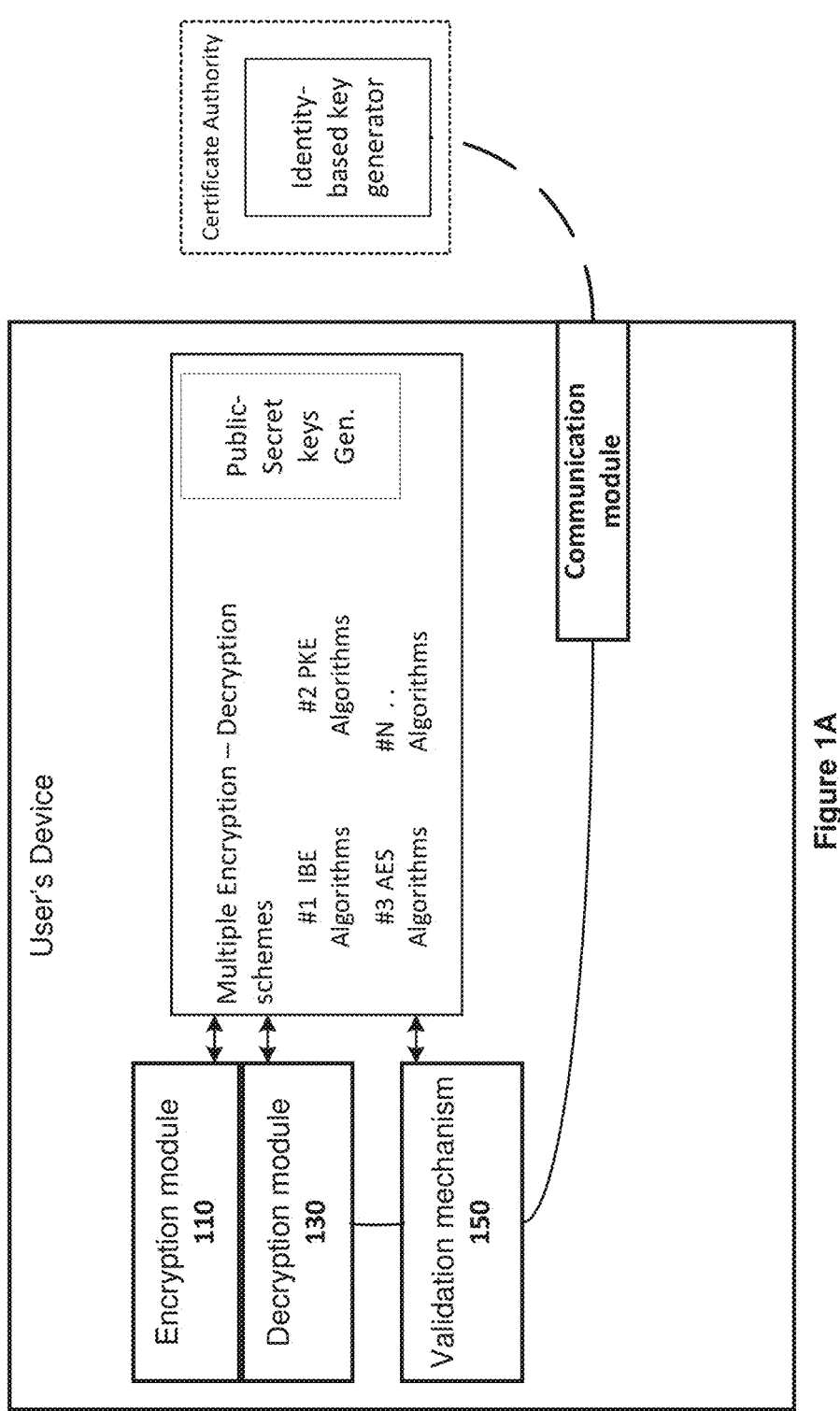

user is determined to be actually validated for a period of time specified for the limited-time of validity certificate. The certificate authority platform grants the users validation.

22 Claims, 9 Drawing Sheets

(56)                    References Cited

U.S. PATENT DOCUMENTS

| | | | |
|---|---|---|---|
| 2005/0246533 A1* | 11/2005 | Gentry | H04L 9/0836 |
| | | | 713/170 |
| 2008/0148047 A1* | 6/2008 | Appenzeller | H04L 9/3073 |
| | | | 713/162 |
| 2009/0307497 A1 | 12/2009 | Appenzeller | |
| 2010/0257358 A1* | 10/2010 | Grajek | H04L 63/06 |
| | | | 713/168 |
| 2019/0156051 A1 | 5/2019 | Beier et al. | |
| 2020/0259647 A1* | 8/2020 | Goncalves | H04L 9/3093 |
| 2021/0218561 A1* | 7/2021 | Kim | H04L 9/0838 |

* cited by examiner

CERTIFICATE-BASED ENCRYPTION IMPLEMENTED WITH MULTIPLE ENCRYPTION SCHEMES

CROSS-REFERENCE

This application is a 35 U.S.C. § 371U.S. National Stage of International Patent Application No. PCT/US21/55759, titled "CERTIFICATE-BASED ENCRYPTION IMPLE-MENTED WITH MULTIPLE ENCRYPTION SCHEMES" having an International Filing Date of 20 Oct. 2021 which claims priority under 35 USC 119 to U.S. provisional patent application Ser. No. 63/123,652, titled "QUANTUM SAFE CERTIFICATE BASED ENCRYPTION (CBE)," filed: 10 Dec. 2020, which is incorporated herein by reference in its entirety.

TECHNICAL FIELD

An embodiment of a concept herein relates to techniques and tools in cryptography.

BACKGROUND

The problem with identity-based encryption is that the certification authority can decrypt anybody's message. So that is a possible reason why identity-based encryption is not deployed on the Internet.

SUMMARY

Provided herein are various methods, apparatuses, and systems for a device implementing an encryption and decryption system.

In an embodiment, a certificate-based encryption appara-tus can have at least a validation module, a decryption module, and an encryption module on a device of a user configured to encrypt a message. The encryption module and the decryption module cooperate with an identity-based key generator of users in a communication system in order to use an identity-based and certificate-based construction using two or more encryption schemes with an encrypted message communicated between users of the communication system such that the encrypted message, received by the device of the user of the communication system needs keys from each of the two or more encryption schemes to be able to decrypt the encrypted message.

The validation module cooperates with a limited-time of validity certificate issued from a certificate authority plat-form to decrypt the encrypted message via the limited-time of validity certificate. The validation module allows the decryption module on the device of the user to decrypt the encrypted message with the limited-time of validity certifi-cate corresponding to an identity of the first user when the first user is determined to be actually validated for a period of time specified for the limited-time of validity certificate. The certificate authority platform grant the users validation and has the identity-based key generator.

These and many more embodiments are discussed below.

DRAWINGS

FIG. 1A illustrates a diagram of an embodiment of a user's device with the encryption module and the decryption module that use multiple identity-based and certificate-based constructions using two or more encryption schemes for each encrypted message communicated between the users of the communication system such that the encrypted message received by a device of user needs keys from each of the two or more encryption schemes to decrypt the encrypted message.

Figure 1B:
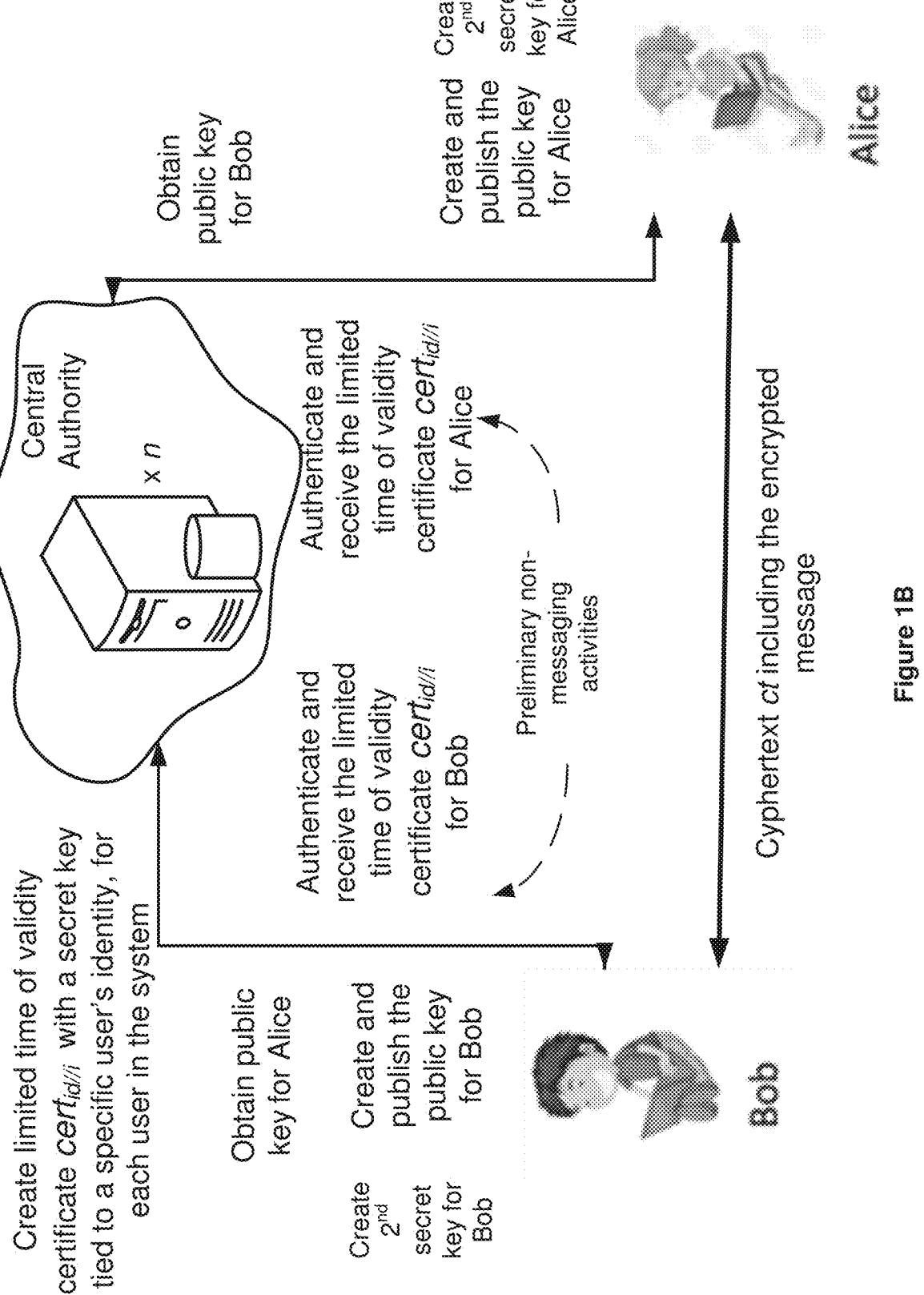

FIG. 1B illustrates a diagram of an embodiment of a communication system using one or more of the identity-based and certificate-based constructions that use two or more encryption schemes, such as an identity-based encryp-tion scheme, a symmetric key encryption scheme, and a public key encryption scheme, for each encrypted message communicated between the users of the communication system.

Figure 2:
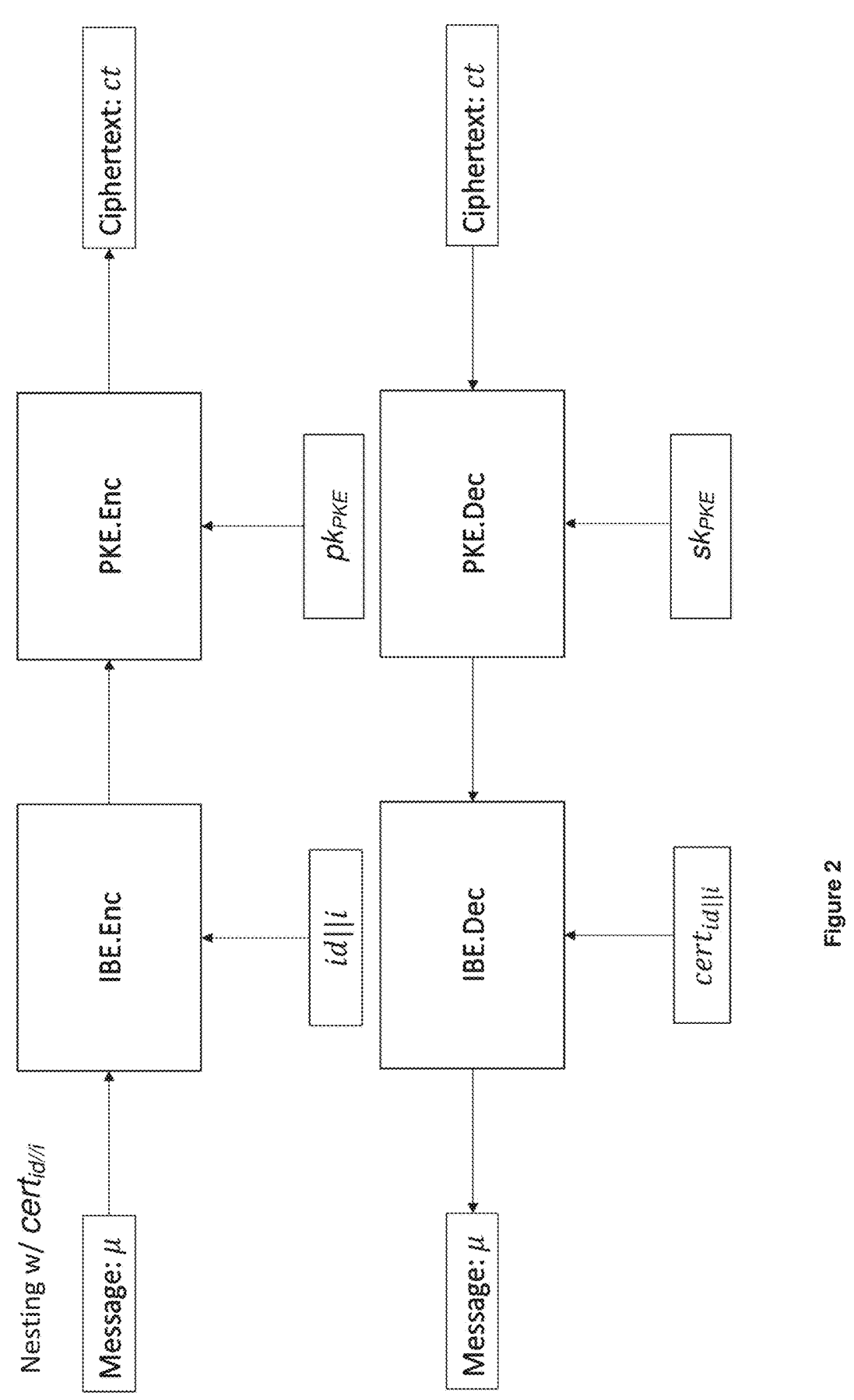

FIG. 2 illustrates a diagram of an embodiment of an identity-based and certificate-based nesting construction to use the encryption module of a user's device that uses two or more encryption schemes, which during a protected messaging phase creates ciphertext with i) an identity-based encryption scheme, and ii) another encryption scheme (e.g. a public key encryption scheme, a symmetric key encryption scheme, etc.) to create the ciphertext that includes the encrypted message that can be transmitted/sent onto the communication system.

Figure 3:
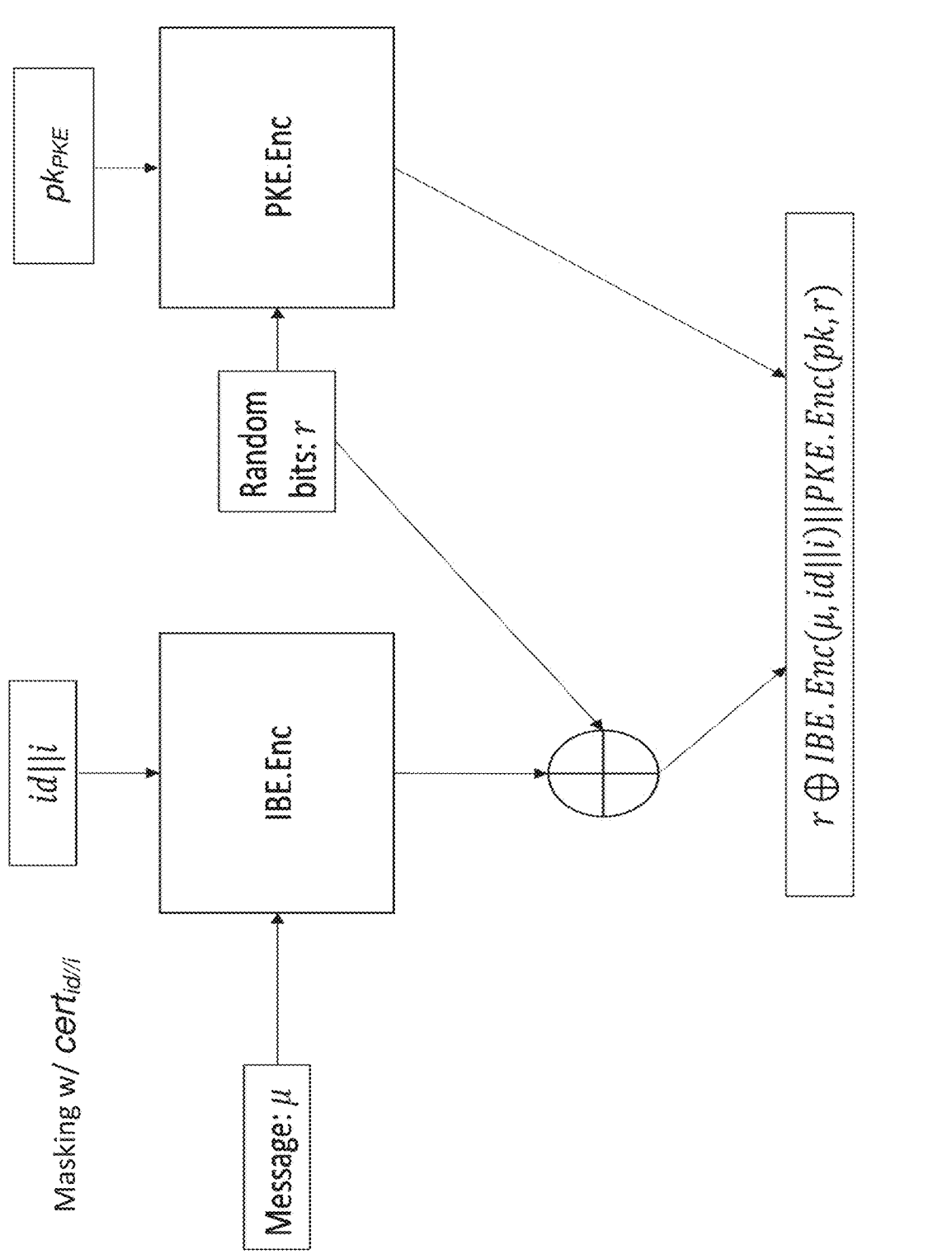
Figure 4:
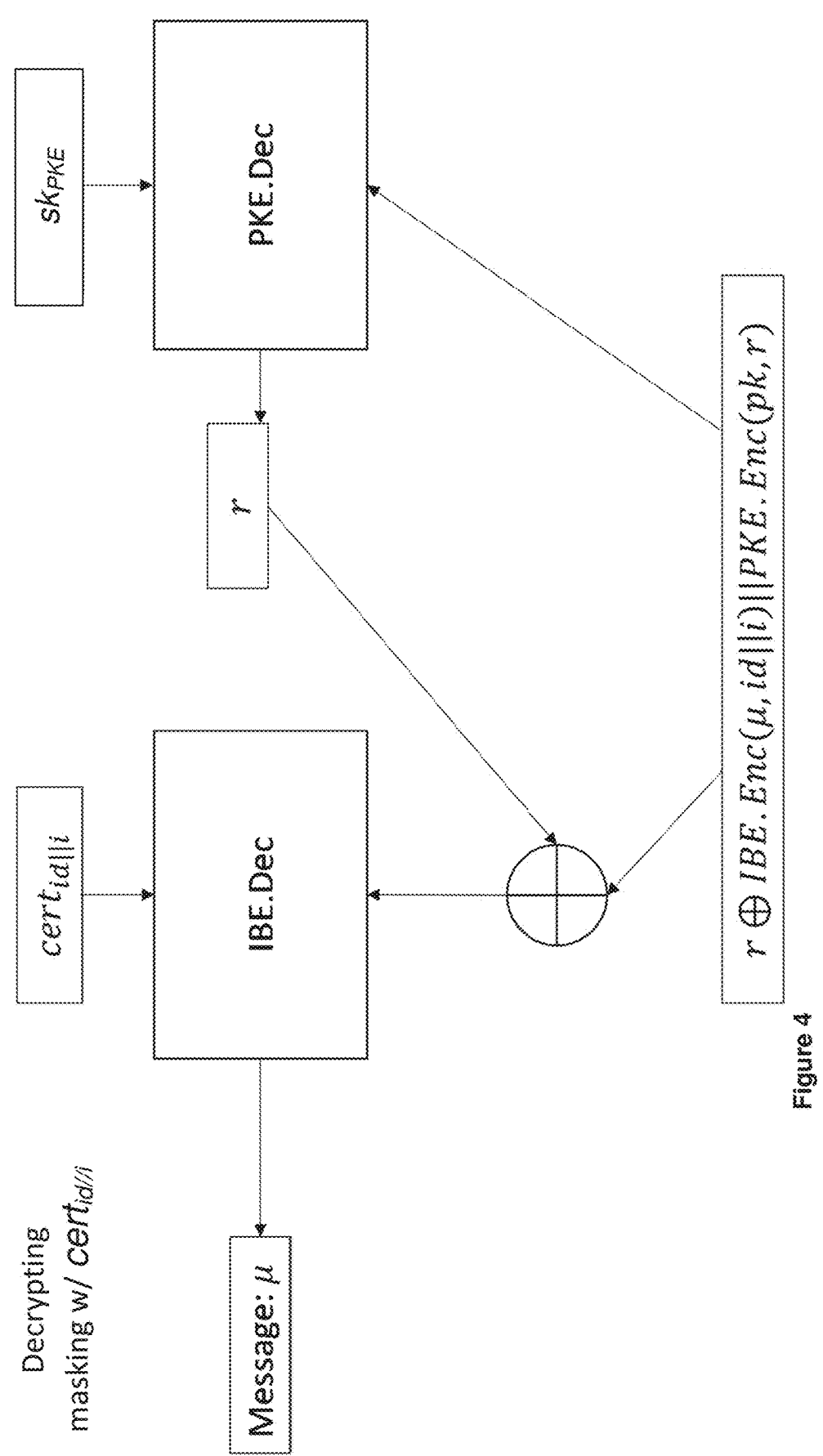

FIG. 3 illustrates a diagram of an embodiment of a second identity-based and certificate-based masking construction using two or more encryption schemes that use the encryp-tion module of a user's device with an identity-based encryption scheme for users of the communication system to encrypt the message and then to mask the resultant product from the identity-based encryption algorithm, and then encrypt the mask value with a second encryption scheme, such as a public key encryption scheme, a symmetric key encryption scheme, etc. in order to create ciphertext that can be transmitted/sent onto the communication system FIG. 4 illustrates a diagram of an embodiment of a second identity-based and certificate-based masking construction using two or more encryption schemes that use the decryp-tion module of the device to process multiple components of the ciphertext ct.

Figure 5:
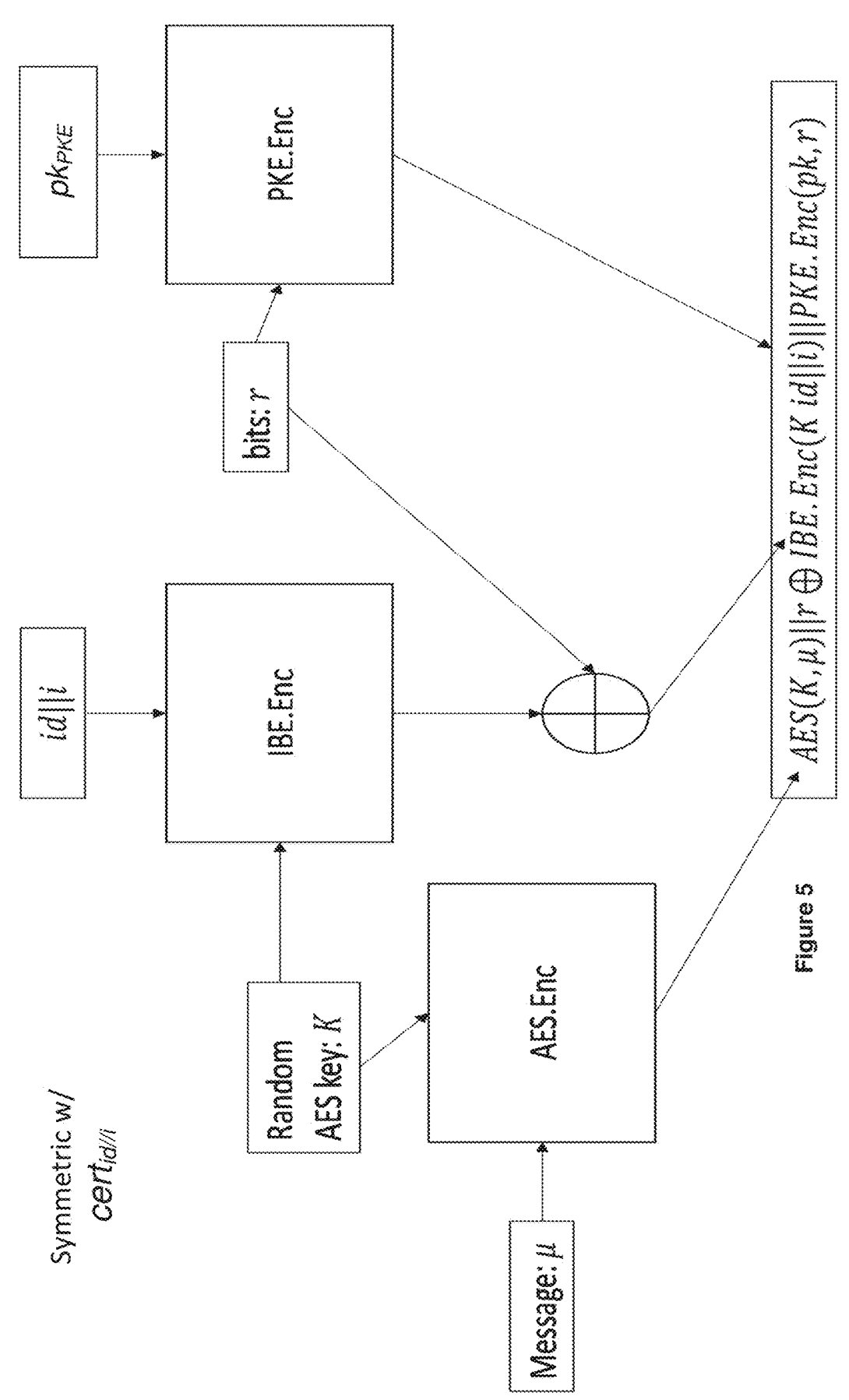

FIG. 5 illustrates a diagram of an embodiment of a third identity-based and certificate-based symmetric cryptosys-tem key construction using multiple encryption schemes that use the encryption module of a user's device, during a protected messaging phase to create ciphertext, with a symmetric key encryption scheme to encrypt a message with an symmetric key encryption algorithm to produce the encrypted message coupled with a limited time of validity for the certificate when that the first user can decrypt messages implemented with an identity-based encryption scheme.

Figure 6:
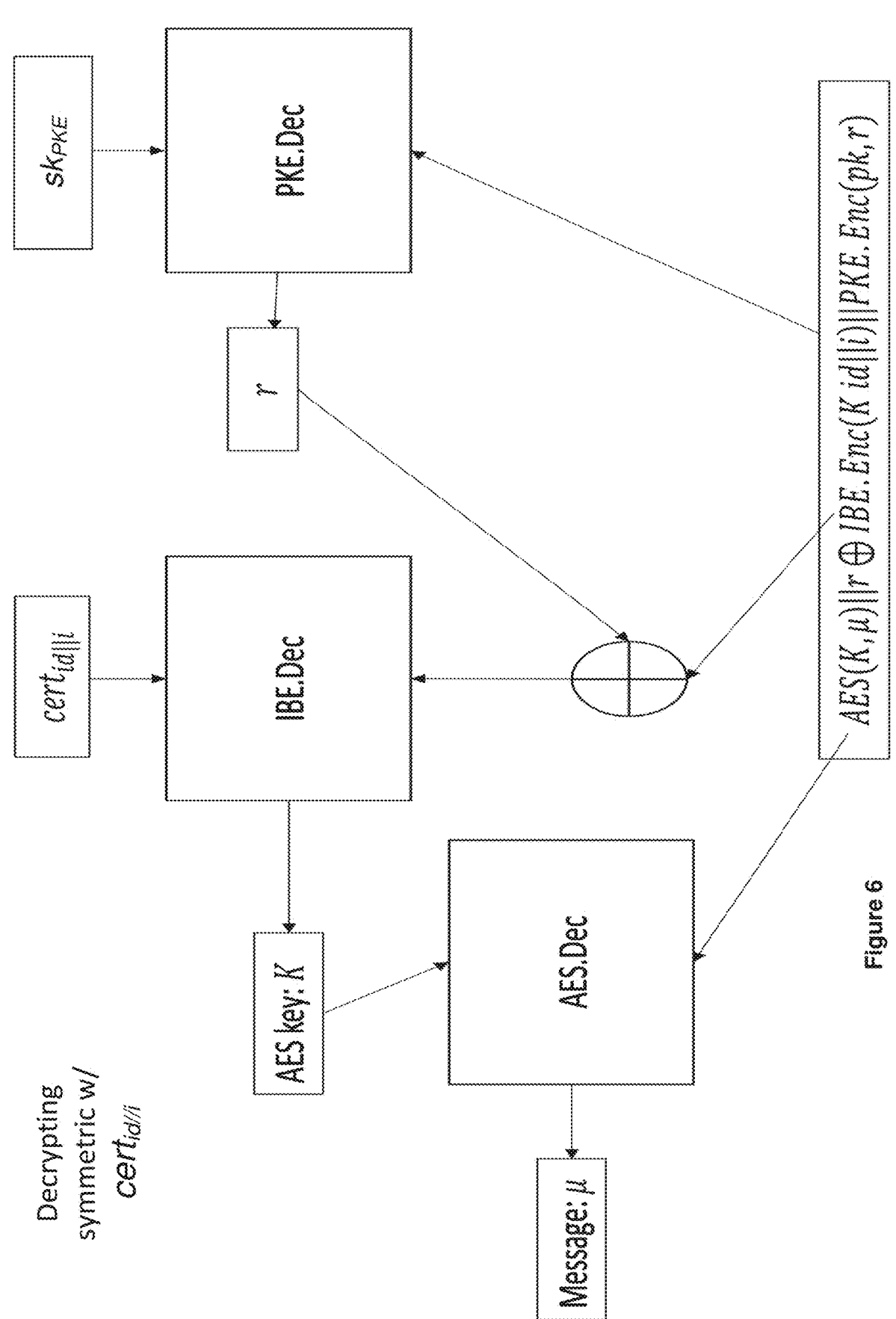

FIG. 6 illustrates a diagram of an embodiment of the third identity-based and certificate-based construction using two or more encryption schemes that use the decryption module of a device of the user to process multiple components of the ciphertext, where one component is the encrypted message, and a second component is the encrypted data item of the AES key used to encrypt the message, appended onto the encrypted message, sent by the sender's device/device of another user.

Figure 7:
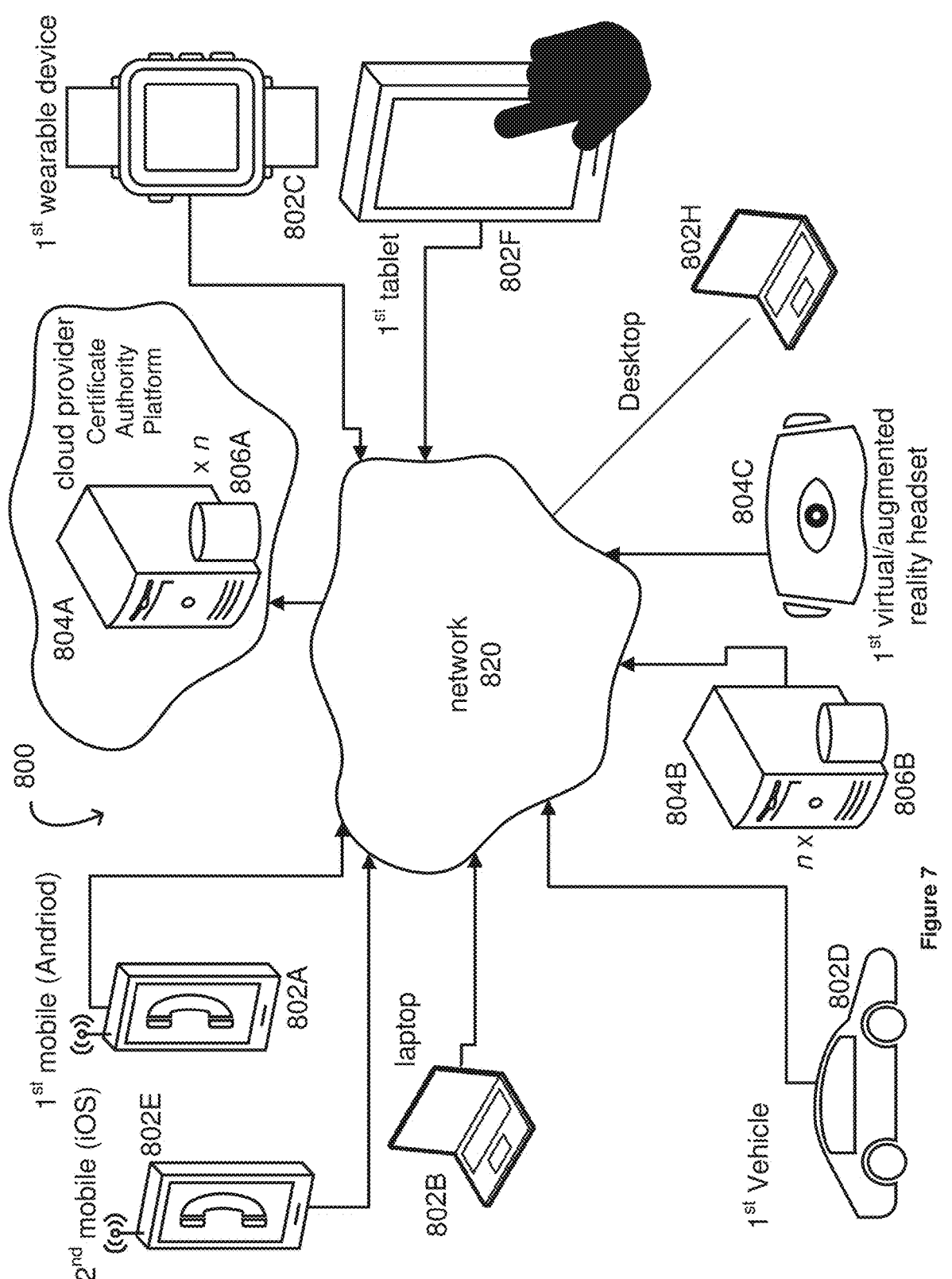
Figure 8:
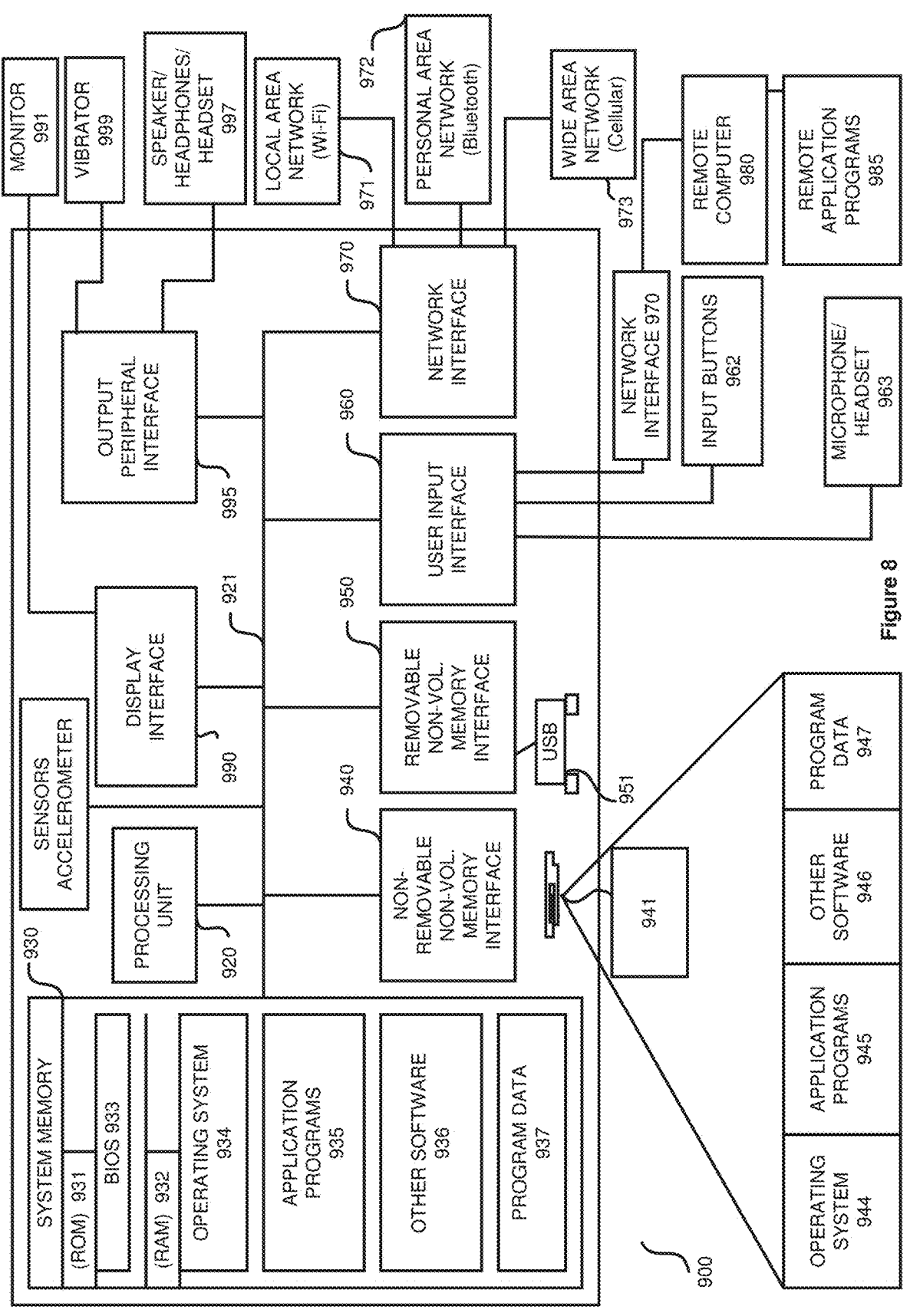

FIG. 7 illustrates a diagram of a number of electronic systems and devices communicating with each other in a network environment in accordance with an embodiment of the certificate-based encryption implemented with two or more encryption schemes; and FIG. 8 illustrates a diagram of an embodiment of one or more computing devices that can be a part of the systems associated with the certificate-based encryption implemented with two or more encryption schemes discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of users, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

FIG. 1A illustrates a diagram of an embodiment of a user's device with the encryption module and the decryption module that use multiple identity-based and certificate-based constructions using two or more encryption schemes for each encrypted message communicated between the users of the communication system such that the encrypted message received by a device of user needs keys from each of the two or more encryption schemes to decrypt the encrypted message. The identity-based and certificate-based constructions use multiple encryptions to produce ciphertext, including the message, such that the receiver's device needs keys from each of the encryption schemes used to decrypt.

Some Components

As shown, the quantum-safe certificate-based encryption system can use an encryption module 110, a decryption module 130, a validation module 150, a communication module, and other various components, on each device of a user. The user's device with these components can communicate and cooperate with a certification authority platform including an identity-based key generator.

The encryption module 110 and the decryption module 130 cooperate with an identity-based key generator of users in a communication system, such as the Internet, a LAN, etc., in order to use any of the identity-based and certificate-based constructions that use two or more encryption schemes, such as an identity-based encryption scheme IBE, an symmetric key encryption scheme AES, and a public key encryption scheme PKE, for each encrypted message communicated between the users of the communication system.

The encryption module 110 encrypts the encrypted message, such as a text-based message, an image, a set of packets, web traffic, other type of traffic that is encrypted, etc., received by a device of a user of the communication system needs keys from each of the two or more encryption schemes to be able to decrypt the encrypted message. The encryption module 110 of the user's device applies a public key from each of the implemented two or more encryption schemes and multiple encryption algorithms to produce ciphertext ct that includes the encrypted message.

The decryption module 130 of the user's device applies a secret key from each of the implemented two or more encryption schemes and multiple decryption algorithms to the received ciphertext ct to produce an unencrypted version of the message $\mu$.

The identity-based key generator uses a key generation algorithm. Each user's device has its own instance of a public-secret key pair generator that uses its key generation algorithm.

The validation module 150 cooperates with the identity-based key generator, which acts as a certificate authority that grants a user's validation, to decrypt messages via a limited-time of validity certificate $cert_{id//i}$ corresponding to that user's identity id issued from the identity-based key generator. The validation module 150 and the decryption module 130 on each device of each user cooperate together to allow the decryption of the ciphertext ct, including the encrypted message. The validation module 150 can check with the limited-time of validity certificate $cert_{id//i}$ to determine when that user is validated for that time-period/epoch i.

The encryption module 110 and the decryption module 130 and the identity-based key generator cooperate with the validation module 150 to establish an efficient identity-centered public key infrastructure ⟨PKI⟩ with an implicit revocation of the limited-time of validity certificate $cert_{id//i}$, based on a specified amount of time, to decrypt the encrypted message. The identity-centered public key infrastructure uses the one or more identity-based and certificate-based constructions that use two or more encryption schemes for communication between users such that each encrypted message processed by the decryption module 130 and the validation module 150 in the device of that user of the communication system needs keys from each of the two or more encryption schemes to decrypt the encrypted message. Note, the encryption module 110 and the decryption module 130 can be implemented as a single combined module as well as two different modules.

Multiple Identity-Based and Certificate-Based Constructions

The design can use multiple identity-based and certificate-based constructions using two or more encryption schemes. Each of the identity-based and certificate-based constructions can use the certificate-based encryption scheme, via a limited-time of validity certificate $cert_{id//i}$, coupled with double encryption in the ciphertext ct being sent. The third identity-based and certificate-based construction can use a double or triple encryption scheme with the limited-time of validity certificate $cert_{id//i}$. The multiple identity-based and certificate-based constructions can use even more encryptions when the hardware in a user's device can efficiently support all of the encryptions.

In general, a first identity-based and certificate-based nesting construction using two or more encryption schemes that use the encryption module 110 of a user's device, during a protected messaging phase to create ciphertext ct, with an identity-based encryption scheme IBE, and then perform another operation with a second encryption scheme (e.g. a public key encryption scheme PKE, a symmetric key encryption scheme AES, etc.). In an embodiment, the encryption module 110 implementing the public key encryption scheme PKE, then applies a public key encryption algorithm PKE.Enc to encrypt the already encrypted data with the public key $pk_{PKE}$ from the public-secret key pair in order to create the ciphertext ct containing at least the encrypted message that can be transmitted/sent onto the communication system. In addition, the decryption module 130 of the user's device reverses the encryption process but applies a secret key/private key from the identity based encryption scheme IBE and the second encryption scheme to the received ciphertext ct to ultimately produce an unencrypted version of the message μ. The process also uses a certificate-based encryption scheme with a limited-time of validity certificate $cert_{id//i}$ that is coupled with the double encryption discussed above.

In general, a second identity-based and certificate-based masking construction using two or more encryption schemes can use the encryption module 110 of a user's device with an identity-based encryption scheme IBE to encrypt the message. Next, the encryption module 110 then applies a mask to the resultant product from the identity-based encryption scheme IBE. The encryption module 110 encrypts the mask with a second encryption scheme, such as public key encryption scheme PKE, symmetric key encryption scheme AES, etc. The encryption module 110 combines them to create ciphertext ct including the encrypted message that can be transmitted/sent onto the communication system. In addition, the decryption module 130 of the user's device reverses the encryption process but applies a secret key/private key from the identity based encryption scheme IBE and the second encryption scheme to the received ciphertext ct to ultimately produce an unencrypted version of the message μ. The process also uses a certificate-based encryption scheme with a limited-time of validity certificate $cert_{id//i}$ that is coupled with masking the message μ with a variable discussed above.

In general, a third identity-based and certificate-based symmetric cryptosystem key construction uses two or more encryption schemes that use the encryption module 110 of a user's device, during a protected messaging phase to create ciphertext ct, with a symmetric key encryption scheme AES, such as an AES encryption scheme, to encrypt a message μ. The symmetric key encryption scheme AES encrypts the message μ with a symmetric key encryption algorithm AES.Enc to produce the encrypted message at least coupled with a limited time of validity for the certificate $cert_{id//i}$ when that user can decrypt messages. A secret key for an identity-based encryption scheme IBE will also be used. In addition, the decryption module 130 of the user's device reverses the encryption process but applies a secret key from the identity based encryption scheme IBE and a secret key from the symmetric key encryption scheme AES to the received ciphertext to ultimately produce an unencrypted version of the message μ.

For each of these constructions, the decryption module 130 of a device is able to process multiple components of the ciphertext ct, where one component can be the encrypted message, and a second component can be an intermediate encrypted result such as an encrypted symmetric cryptosystem key (e.g. an AES key), an encrypted mask value, etc., used in creating the ciphertext ct.

In all of these identity-based and certificate-based constructions that use two or more encryption schemes, the certification authority platform cannot read and/or reuse messages of the users because the system hides the read ability of an encrypted item (e.g. message)/the ability to decrypt the message from the certificate authority platform by never providing the secret key generated by the non-identity based scheme to the certification authority. In addition, a user that is not certified by the certification authority platform cannot decrypt any messages sent to them until the certificate obtained from the certification authority indicates that user is authorized to decrypt for that limited period of time. Each identity-based and certificate-based construction that uses two or more encryption schemes will cause the encryption module 110 and the decryption module 130 to perform different operations depending upon the particular identity-based and certificate-based construction being implemented.

Each identity-based and certificate-based construction is designed to be quantum safe. For example, the validation module 150 checks to determine whether the limited-time of validity certificate $cert_{id//i}$ is still valid, and when so, the validation module 150 is configured to supply the secret key of the identity-based encryption scheme to the decryption module 130. The limited-time of validity certificate $cert_{id//i}$ contains a secret key tied to the identity of the first user and the time period of when the first user is validated. Accordingly, the decryption module 130, the validation module 150, and the limited-time of validity certificate $cert_{id//i}$ cooperate with the information in the limited-time of validity certificate certian and a requirement for the need for secret keys from each of the two or more encryption schemes to be able to decrypt the encrypted message in order to make each identity-based and certificate-based construction using the two or more encryption schemes safe from being hacked by an attack from a quantum computer. Thus, for example, if you use an identity-based encryption scheme and public key encryption scheme PKE in the identity-based and certificate-based construction using two or more encryption schemes, the resulting certificate base encryption is safe from quantum computing attacks. Note, the two or more encryption schemes that are implemented are individually quantum safe; and thus, as a result of combining these two or more encryption schemes with the limited time of validity certificate that results in the certificate-based encryption apparatus being quantum safe.

FIGS. 2-7 will go over each of the identity-based and certificate-based constructions using two or more encryption schemes in greater detail.

FIG. 1B illustrates a diagram of an embodiment of a communication system using one or more of the identity-based and certificate-based constructions that use two or more encryption schemes, such as an identity-based encryption scheme, a symmetric key encryption scheme, and a public key encryption scheme, for each encrypted message communicated between the users of the communication system.

The communication system can have a certificate authority platform using a first encryption scheme such as the identity-based encryption scheme IBE. The identity-based key generator is configured to act as a certificate authority granting users of the communication system validation to decrypt messages via a limited-time of validity certificate $cert_{id//i}$ corresponding to that particular user's identity issued from the identity-based key generator.

The communication system has a plurality of instances of public-private key pair generators, each resident on its own device of the users of the communication system, such as Bob's device and Alice's device. The public-secret key pair generators on the devices are configured to implement a second encryption scheme, such as PKE, AES, etc. The encryption module 110 of that device applies aspects of the two or more encryption schemes to ciphertext, including messages, communicated between the devices of the users of the system. The secret key generated by each of the public-secret key pair generators is not sent or in any other way communicated to the certificate authority so that the certificate authority platform does not have any ability to decrypt the messages communicated between the users of the communication system. Note, the second encryption scheme is independent from and different than the identity-based encryption scheme IBE.

Preliminary Non-Messaging Activities

Next, several preliminary non-messaging activities occur before an actual communication of a protected encrypted message is sent between users in the communication system. For example, the certificate authority platform creates a limited-time of validity certificate $cert_{id//i}$ with a secret key tied to a specific user's identity id, for each user in the system. Bob's communication module will authenticate and receive the limited-time of validity certificate $cert_{id//i}$ for Bob from the certificate authority platform. Likewise, Alice's communication module will authenticate and receive the limited-time of validity certificate $cert_{id//i}$ for Alice from the certificate authority platform.

In an example, Bob's encryption module 110 can have a public-secret key generator that creates and publishes the public key $pk_{PKE}$ for Bob by posting the public key $pk_{PKE}$ online in general and/or by sending that public key $pk_{PKE}$ to the certificate authority platform to post that public key $pk_{PKE}$ for Bob. Bob's encryption module 110 creates a second key—the secret key $sk_{PKE}$, for Bob's decryption module 130 to be able to at least partially decrypt encrypted messages sent to Bob. Bob's public-secret key generator generates his secret key $sk_{PKE}$ in an encryption scheme different than that used by the certificate authority. Likewise, Alice's encryption module 110 can have a public-secret key generator that creates and publishes the public key $pk_{PKE}$ for Alice by posting the public key $pk_{PKE}$ online in general and/or by sending that public key $pk_{PKE}$ to the certificate authority platform to post that public key $pk_{PKE}$ for Alice. Alice's encryption module 110 creates a second key, a secret key, for Alice's decryption module 130 to be able to at least partially decrypt encrypted messages sent to Alice. Alice's public-secret key generator that generates her second secret key in an encryption scheme different than that used by the certificate authority platform. Similarly, each user of the communication system can have devices with similar components to Bob's device and Alice's device.

Also, Bob's communication module will obtain the public key $pk_{PKE}$ for Alice from Alice's published information online when Bob wants to encrypt a message to be sent to Alice's device. Likewise, Alice's communication module will obtain the public key $pk_{PKE}$ for Bob from Bob's published information online when Alice wants to encrypt a message to be sent to Bob's device. In each identity-based and certificate-based construction that uses the public key $pk_{PKE}$ of the public key encryption scheme PKE, each public key is tied to its own specific user id. The communication module of another user's device still needs to get that public key $pk_{PKE}$ of the receiver user from the public key encryption scheme PKE somehow, but the other user's devices need to get the public key $pk_{PKE}$ of the receiver user once because that doesn't change. After obtaining the public key $pk_{PKE}$ of the receiver user then the encryption module 110 can keep encrypting to that user and have a guaranty that only when that user is certified as valid, then their decryption module 130 can decrypt in order to create a limited time of validity, certificate-based encryption scheme that is safe from quantum computing attacks.

Each of the identity-based and certificate-based constructions' philosophy is two-fold in that the construction doesn't trust the users to certify themselves. The limited-time of validity certificate $cert_{id//i}$ has to come from an independent third party—the certificate authority platform, which regularly authenticates and verifies its users. But the identity-based and certificate-based construction also doesn't trust that independent third party to not basically read the users' messages. And, the identity-based and certificate-based construction understands encrypted systems still can be hacked so at least one of the secret keys needed for decryption merely has a limited time of validity until that secret key expires another different instance will now be valid.

Each device cooperates with the identity-based key generator to include a validation module 150 to check whether that user is authorized to decrypt for that limited period of time/epoch i. The validation module 150 is configured to cooperate with an identity-based key generator, acting as a certificate authority granting users validation, where the identity-based key generator uses three or more post-quantum, identity-based, encryption-decryption constructions. The identity-based key generator and the validity mechanism cooperate through the limited-time of validity certificate $cert_{id//i}$ to designate that the user can legitimately use the secret key/private key of the identity-based encryption scheme IBE to decrypt the encrypted message by the validity mechanism the checking that the limited-time of validity certificate $cert_{id//i}$ is valid for the current period of time/epoch for that specific user (e.g. the first user, or the second user, or third user, etc. but not generically all of the users). The secret key/private key of the identity-based encryption scheme IBE can be contained as part of the certificate to decrypt an encrypted message, at least one of a text-based dispatch, an image, and/or other communication, by providing the user's device its limited-time of validity certificate $cert_{id//i}$ that is valid for a specified period of time/epoch i. And thus, the identity-based key generator, which is part of a certificate authority platform that grants a user validation by sending each validated user their limited-time of validity certificate $cert_{id//i}$ (e.g. identity-based certificate tied to their identity) with the secret key for that time period and any other security measures to ensure the uniqueness that this particular certificate has indeed come from the certificate authority platform itself and is valid for this particular limited period of time. In a simple, implementation the certificate can contain the user's identity tied with the secret key for that time period concatenated with the limited time period it is valid. The identity-based certificate is valid for legitimately decrypting an encrypted message during the time period/epoch i. In addition, a limited-time of validity certificate $cert_{id//i}$ of a formerly valid user becomes invalidated after a set time-period. The identity-based encryption scheme IBE uses a key generation algorithm to generate an identity-based key, such as a public identity-based key $pk_{PKE}$ for a given user and a secret identity-based key for a given user, based on their identity (email address, user name, etc.)

Thus, the user and their user's device(s) receiving the encrypted ciphertext ct needs to be certified by the certificate authority platform, which as a non-messaging activity regularly authenticates and verifies its users, in order to allow them to decrypt the encrypted ciphertext ct. As discussed, the certificate authority platform uses the identity-based encryption scheme IBE and the secret key from the identity-based encryption scheme has the limited time of validity coupled to that secret key. Other security measures can be put into the limited-time of validity certificate $cert_{id//i}$ issued by the third party certificate authority platform to ensure the uniqueness of this limited time of validity certificate $\text{cert}_{id//i}$ as opposed to a fake created by a hacker. Otherwise, anyone can come and say they're the intended recipient and decrypt the encrypted item.

Example Aspects of Cryptographic Encryption Schemes

Public Key Encryption Scheme

The variables throughout this subsection are a modulus q, dimensions n, m, a noise width η, and a polynomial ring $\mathcal{R}_q = \mathbb{Z}_q/(x^n+1)$. Also, let $$\delta = \left\lfloor \frac{q}{2} \right\rfloor$$

be a scaling parameter. An example parameter regime is n=1024, m=2, q=12289, and η=222.

Algorithms:

The key generation algorithm, PKE. KeyGen, samples a random $$a \leftarrow \mathcal{R}_q^m,$$

a discrete Gaussian vector $$x \leftarrow \mathcal{D}_{\mathcal{R}_q,\eta}^m,$$

sets $u=a^t x \in \mathcal{R}_q$. The public key is returned as $$pk = (a, u) \in \mathcal{R}_q^{m+1}$$

and the secret key is sk=x.

The encryption algorithm, PKE.Enc(μ, pk), takes as input a message $\mu \in \{0,1\}^n$ as well as the public key pk=(a, u)∈ $\mathcal{R}_q^{m+1}$, and computes the following:

Samples a uniformly random s∈ $\mathcal{R}_q$ and a discrete Gaussian $$e \leftarrow \mathcal{D}_{\mathcal{R}_q,\eta}^m.$$

Set $$b = sa + e \in \mathcal{R}_q^2.$$

Samples d← $\mathcal{D}_{\mathcal{R}_q,\eta}$, c=su+d+δμ∈ $\mathcal{R}_q$.

Returns the ciphertext as ct=(b, c).

The decryption algorithm, PKE.Dec(ct, sk), takes as input the ciphertext ct and the secret key sk=x and computes the following:

Computes b'=$b^t x \in \mathcal{R}_q$, c'=c−b'∈ $\mathcal{R}_q$, then rounds each coefficient of c' to the nearest multiple of δ (either 0 or δ). Then, it concatenates each rounded coefficient as the potential, binary message.

Identity Based Encryption Scheme

The variables throughout this subsection are a modulus q=, dimensions n=, m=, a noise width η=, and a polynomial ring $\mathcal{R}_q = \mathbb{Z}_q/(x^n+1)$. Also, let $$\delta = \left\lfloor \frac{q}{2} \right\rfloor$$

be a scaling parameter and let H: $\{0,1\}^* \rightarrow \mathcal{R}_q$ be a hash function known to all parties.

Algorithms:

The setup algorithm, IBE.Setup (n, m, q), samples a vector or polynomials together with a trapdoor: (a, $T_a$)←TrapGen(n, m, q).

The key generation algorithm, IBE.KeyGen(id, a, $T_a$), hashes the id to get H(id)=u∈ $\mathcal{R}_q$, then samples x←TrapSample(a, $T_a$, u) where x is a discrete Gaussian vector over $\mathcal{R}_q$ conditioned on $a^t x = u \in \mathcal{R}_q$. The algorithm returns the secret identity key $\text{sk}_{id}$ for IBE=x.

The encryption algorithm, IBE.Enc(μ, id), takes as input the receiver's identity, id, and a message $\mu \in \{0,1\}^n$, then computes:

Hash the identity to u=H(id), set pk for IBE=(a, u), then runs ct←PKE.Enc(μ, pk) from above.

Return ct.

The decryption algorithm, IBE.Dec(ct, pk), takes as input the ciphertext ct and the secret key $\text{sk}_{id}$ and computes u'←PKE.Dec(ct, $\text{sk}_{id}$).

AES Encryption Scheme as an Example of a Symmetric Cryptosystem Key

An example AES encryption scheme uses, for example, a 256-bit key length to encrypt and decrypt messages. In this example, each cipher encrypts and decrypts data in blocks of 128 bits using cryptographic keys of 256 bits. The AES encryption algorithm defines numerous transformations that are to be performed on data stored in an array. The AES encryption scheme has ciphers that use the same AES key for encrypting and decrypting (and thus is the equivalent of the public key as well as the secret key in this design). The encryption module 110 of the sender's device and the decryption module 130 of the receiver's device must both know—and use—the same AES key, which in the third scheme is randomly sampled in AES and then encrypted and sent to the receiver. The AES encryption algorithm can use a random AES key. The first step of the cipher is to put the data into an array—after which, the cipher transformations are repeated over multiple encryption rounds. Thus, the data, such as text of a message, is divided into blocks. Next, key expansion occurs, which involves taking the initial AES key and using it to come up with a series of other keys for each round of the encryption process.

Next, a round consists of several processing steps that include substitution, transposition and mixing of the input plaintext to transform it into the final output of ciphertext. There are 14 rounds for 256-bit keys. The first transformation in the AES encryption cipher is substitution of data using a substitution table; the second transformation shifts data rows, and the third mixes columns. The last transformation is performed on each column using a different part of the encryption key.

Validation

In an embodiment, immediately prior to when the certificate is about to be issued to that particular user of the communication system, a portion of the validation module 150 with the identity-based key generator (e.g. in the central authority on-line platform), checks to see whether that particular user is still deemed that they should be valid. When, the certificate authority platform does not give the user their time based (e.g. daily) certificate, then that particular user was deemed not to be valid, and the certificate authority platform will not issue another certificate until the user is once again valid. Likewise, when a user tied to their limited-time of validity certificate $cert_{id//i}$ issued from the identity-based key generator becomes not legitimate during this limited time of validity, then the certificate authority platform can issue a communication to invalidate that previous issued certificate and require a newly issued limited-time of validity certificate $cert_{id/i}$ with a new secret key in order for that particular user to be able to decrypt messages. Again, a user's incoming encrypted messages are not decryptable during this period/epoch while the certificate $cert_{id//i}$ is invalidated. Other Users of this communication system can continue to send their encrypted messages to other users without needing to check any period-specific data about the user.

In an embodiment, the certificate authority platform can run an algorithm before each limited time of validity/epoch time period begins. An example identity-based key generation algorithm, $IBE.Gen(1^{\lambda})$, takes as input a security parameter and outputs a public identity-based key for a given user and a secret identity-based key from the identity-based encryption scheme IBE for a given user. The certificate authority platform makes the public identity-based key for a given user ($pk_{IBE}$) and params publicly available to all users in the network but uses the secret identity-based key for a given user ($sk_{IBE}$) in the generation/creation of the limited-time of validity certificate $cert_{id//i}$. Again, the limited-time of validity certificate $cert_{id//i}$ can contain at least the secret/private key issued by the certificate authority platform and a time period of time that this certificate $cert_{id//i}$ is valid. Thus, the validation module 150 portion in the certificate authority platform can use an update algorithm, cooperating with the identity-based key generator which takes as input a user's identity, a time period for a valid certificate, a user's public key from the PKE, and the secret key, and outputs a certificate, cert (id, i), specifically for that user id valid for/during the specified time period.

As discussed, the limited time of validity for the certificate is broken into different time-periods that a user can decrypt an encrypted message with the identity based secret key. The validation module 150 uses techniques to loosely synchronize a clock of every user's device with respect to how the system views time so that they all share the essentially a same clock. For example, just like an invite on a calendar will trigger an algorithm to automatically synchronize a clock of user's in different time zones with respect to how the system views time. This ensures time periods/epoch are universal for the time period for validation of encryption/decryption can occur.

FIG. 2 illustrates a diagram of an embodiment of an identity-based and certificate-based nesting construction to use the encryption module of a user's device that uses two or more encryption schemes, which during a protected messaging phase creates ciphertext with i) an identity-based encryption scheme, and ii) another encryption scheme (e.g. a public key encryption scheme, a symmetric key encryption scheme, etc.) to create the ciphertext that includes the encrypted message that can be transmitted/sent onto the communication system.

Overview

The identity-based and certificate-based nesting construction uses the encryption module 110 of a user's device that uses two or more encryption schemes during a protected messaging phase to create ciphertext ct that includes the encrypted message. The identity-based and certificate-based nesting construction uses an example overall encryption scheme:

$$ct=PKE.Enc(pk_{PKE},IBE.Enc(id\|i,\mu)).$$

Preliminary Non-Messaging Activities

As a recap, preliminary non-messaging activity that occurs before the protected messaging phase can be as follows.

Prior to issuing a limited-time of validity certificate $cert_{id//i}$, the certificate authority also checks to see whether a user such as Bob, Alice, etc., is a valid user for this limited time period is and then generates and sends the limited-time of validity certificate $cert_{id//i}$ to the validation module 150 on the user's device. The limited-time of validity certificate $cert_{id/i}$ is valid for time period i to allow Bob's decryption module 130 to decrypt encrypted items sent to Bob's device. The identity-based key generator uses the identity-based encryption scheme IBE to produce i) a published key to encrypt items and ii) the limited-time of validity certificate $cert_{id/i}$, which contains a secret key tied to an identity of a specific user (e.g. Bob) and a limited time period i of when that user is validated to decrypt the encrypted message for the user. The secret key can form part of the certificate but normally needs to be requested merely once, before, at, or during, the limited time period for validity and then is used to decrypt all encrypted messages subsequently until the time period expires. Note, the certificate authority platform knows each user's secret key $sk_{IBE}$ in the communication system corresponding to that specific user's identity created under the identity-based encryption scheme IBE because the identity-based key generator in the certificate authority platform generated that secret key. The identity-based key generator uses the identity-based encryption scheme IBE. The identity-based key generation of the certificate authority platform runs the identity-based encryption scheme IBE to generate its keys. Setup to get $(a, T_a)\leftarrow TrapGen(n, m, q)$ and it sets ($pk_{IBE}$, $sk_{IBE}$, params) as $pk_{IBE}=a$, $sk_{IBE}=T_a$ and params as a string describing the ring $\mathcal{R}_q=\mathbb{Z}_q/(x^n+1)$.

The certificate authority platform publishes ($pk_{IBE}$, params) and keeps the secret key $sk_{IBE}$ for the identity-based encryption scheme IBE secret. The public key $pk_{PKE}$ of a user in the identity-based encryption scheme can be some unique information about the identity of the user (e.g. a user's email address). This means that a sender who has access to the public parameters of the communication system can encrypt a message $\mu$ using at least e.g. the text-value of the receiver's name or email address in a public key for encrypting in the identity-based encryption scheme.

The public key encryption scheme PKE is used merely by the users. Instances of a public-secret key pair generator on each of the user's device can use the public key encryption scheme. The public-secret key generator of the users' devices generate their own public secret key pair $pk_{PKE}$, $sk_{PKE}$ in the public key encryption scheme PKE and the certificate authority platform does not know the user's secret key $sk_{PKE}$ in the public key encryption scheme PKE. Instances of a public-secret key pair generator on each of the user's device use the public key encryption scheme. For the public key generation algorithm run by the user returns $pk_{PKE}$ and $sk_{PKE}$. Thus, a public-secret key generator in the encryption module 110 on the user's device (e.g. Bob's device) generates his public key $pk_{PKE}$ together with his secret key $sk_{PKE}$. The encryption module 110 on the user's device publishes the public key $pk_{PKE}$ online in general and/or with the central authority platform, which other users in the communication system can utilize to encrypt messages such as, text based dispatches, pictures, videos, etc., to the user's device. The identity-based and certificate-based nesting construction can use the identity of the recipient concatenated with the time period valid as a new identity that then other users of this system can encrypt with.

The specific user can have multiple devices, and each device needs to know and implement both the public key encryption scheme PKE and the identity-based encryption scheme IBE.

Encryption Process

The encryption module 110 of the device of the user, during a protected messaging phase, is configured to create ciphertext ct. The encryption module 110 is configured with an identity-based encryption scheme IBE for users of the communication system to encrypt the message $\mu$ with an identity-based encryption algorithm IBE.Enc to produce an encrypted data. The identity-based encryption algorithm IBE.Enc takes as input a message $\mu$ and a user's public key in the identity-based encryption scheme, $pk_{IBE}$ to produce an encrypted data. The encryption algorithm IBE.Enc can also take as input a message $\mu$, a user's identity, id, and a time-period i to compute the encryption for that encrypted data. The identity-based encryption scheme IBE by first encrypting with a public key $pk_{IBE}$ under the id of Bob, e.g. the intended recipient (e.g. Bob||562, Bob@gmail.com, etc.) of the message $\mu$, concatenated with the time period this key is valid for: e.g., "Bob||562" valid for "Jan. 22, 2021" (id||i). In this example, Alice's encryption module 110 encrypts an item, for example a message $\mu$, to Bob with the identity-based encryption scheme IBE by first encrypting with a public key under the id of Bob, the intended recipient of the message $\mu$, concatenated with the time period i this key is valid for: e.g., "Bob||562" feeding into the identity-based encryption algorithm IBE.Enc of the identity-based encryption scheme IBE.

Next, the identity-based and certificate-based nesting construction is configured to use the encryption module 110 of the device of the user (e.g. Bob) to perform another operation on the encrypted data such that the encryption module 110 of the device of the user uses a second encryption scheme (e.g. a public key encryption scheme PKE, a symmetric key encryption scheme such as Advanced Encryption Standard (AES), etc.) to encrypt the already encrypted data from the identity-based encryption scheme IBE. The encryption module 110 then outputs/creates the ciphertext ct containing the encrypted message. The ciphertext of the encrypted message can be transmitted onto the communication system to another user's device (e.g. Alice). Thus, the encrypting of message $\mu$ to user id during time period/epoch i on message is performed by initially encrypting the message $\mu$ using the identity-based encryption scheme IBE, then encrypting the resulting ciphertext (e.g. encrypted data) with the public key encryption scheme PKE as follows ct=PKE.Enc($pk_{PKE}$, IBE.Enc(id||i, $\mu$)). Therefore, the message $\mu$ has been encrypted with two or more encryption schemes by being layered/nested within the two encryption schemes.

However many variations of this encryption scheme can be implemented.

In the above example, the encryption module 110 uses an identity-based algorithm and the user's identity (tied to an identity of that specific user) and a time (shown as id//i combined in the figure) as the public key $pk_{IBE}$ from the identity-based encryption scheme IBE to encrypt the message $\mu$ with and then the encryption module 110 takes the generated encrypted data and encrypts again with the, for example, the public key encryption scheme PKE and the public key $pk_{PKE}$ of this sender's device. Note, however, in an embodiment, the identity-based and certificate-based nesting construction could also perform the reverse of encryption schemes e.g. initially encrypt with the public key encryption scheme PKE and then nest that result within the identity-based encryption scheme IBE.

In the above example, a first user's device (e.g. Alice's device) encrypts items intended for transmission to Bob's device. However, when Bob's device encrypts a message $\mu$ to be sent to another user's device (e.g. Alice's device), then the roles reverse. Accordingly, the first user now is Bob and Bob's encryption module 110 encrypts the message $\mu$ and other data items to generate the ciphertext ct and then Alice's decryption module 130 would receive the ciphertext ct.

Decryption Process

This is from Bob's device's perspective. Another user (e.g. Alice's encryption module 110) has encrypted an item, for example a message $\mu$, to Bob with two or more encryption schemes, which is received as ciphertext ct. When receiving ciphertext ct that includes the encrypted message, the decryption module 130 of the device of the first user (e.g. Bob) is configured to process the ciphertext ct of the encrypted message sent by a device of another user (e.g. Alice). Now Bob's decryption module 130 implementing at least the public key encryption scheme PKE and identity-based encryption scheme IBE needs the secret keys from each of the two or more encryption schemes to be able to decrypt the encrypted message. Again, Bob's public-secret key generator on his device generates a secret key $sk_{PKE}$ for the public key encryption scheme PKE to decrypt ciphertext ct that indicates the intended recipient of the message $\mu$ is e.g. "Bob||562". The decryption module 130 of device of the user is configured to apply a decryption algorithm PKE.Enc to decrypt the sent ciphertext ct with the secret key $sk_{PKE}$ corresponding to an identity of the first user (e.g. Bob//562) in the communication system to produce an intermediate decryption result. Thus, Bob's decryption module 130 uses a decryption algorithm PKE.Enc to take as input the ciphertext and the secret key sk from the public key encryption scheme PKE to compute to at least partially decrypt an encrypted message.

Next, the first identity-based and certificate-based nesting construction is configured to use the decryption module 130 of the device to perform another operation where the decryption module 130 decrypts the resultant product of the encrypted message, decrypted from public key encryption scheme PKE, with the identity-based encryption scheme IBE and secret key generated by the certificate authority platform, to produce an unencrypted version of the message $\mu$. Thus, decryption by user id during the limited time of validity/epoch i on ciphertext ct is performed by initially decrypting the received ciphertext ct using the public key encryption scheme PKE, and then decrypting the resulting product with an identity-based decryption algorithm from the identity-based encryption scheme IBE.

Thus, the decrypting of message $\mu'$ to user id during time period/epoch i is performed by initially decrypting the ciphertext ct using the public key encryption scheme PKE, and then decrypting the resulting encrypted data with the identity-based encryption scheme IBE as follows: $\mu'$=IBE.Dec($cert_{id,i}$, PKE.Dec($sk_{PKE}$, ct)).

Note, the validation module 150 also performs functions during the decryption process as detailed more below.

Note, similarly when Alice's device decrypts ciphertext ct including the encrypted message sent by another user's device (e.g. Bob's device), then the roles reverse and accordingly the other user would be Bob's encryption module 110 encrypting the message μ and other data items and the first user would be Alice's decryption module 130 that decrypts the ciphertext ct including the encrypted message and other data items.

Thus, the encryption module 110 and the decryption module 130 cooperate with the identity-based key generator to use the two encryption schemes to allow users to send each other encrypted messages using 1) the public key generated by the user's device in conjunction with 2) the public key from the identity-based encryption scheme from the certification authority platform to encrypt, and 3) the secret key generated by the user's device in conjunction with 4) the secret key from the identity-based encryption scheme from the certification authority platform, to decrypt.

Referring back to FIG. 1, the validation module also performs functions during the decryption process. The validation module 150 is configured to allow the device of the user (e.g. Bob) to decrypt the encrypted message with the limited-time of validity certificate $cert_{id//i}$ issued from the identity-based key generator when the first user checks out to be actually validated for that limited time of validity (during that time period) to decrypt the encrypted message. Thus, the central authority platform can issue the secret key under the id of Bob, e.g. Bob//562 the intended recipient of the message, concatenated with the time period this key is valid for (e.g. Jan. 22, 2021) as part of the limited-time of validity certificate $cert_{id//i}$, and correspondingly the validation module 150 makes a check on this to determine whether an ability to decrypt is valid or not.

Note some additional points on the validation module and the limited-time of validity certificate. The validation module 150 uses an update algorithm. The update algorithm uses a certificate-based encryption $Upd(id, i, pk_{PKE}, sk_{IBE})$, run by the validation module 150 cooperating with the identity-based key generator to initially run the key generation for the identity-based encryption scheme IBE as follows. KeyGen $(id||i, a, T_a)$, where the identity string input is the user's id concatenated with the time period for a valid certificate, to get $cert_{id,i}=sk_{id||i}$ and returns the limited time of validity certificate to the user's communication module.

In an example, $cert_{id,i}$ i is the limited time of validity (e.g. a month) and id will be Bob (e.g. Bob@gmail.com). The identity (id) will constantly be the user's id—Bob. The limited-time of validity certificate $cert_{id//i}$ can concatenate Bob with the month and let's say the validity period is the entire month. Every month a communication module on a user's device authenticates with the certificate authority platform to get a new limited-time of validity certificate $cert_{id//i}$. Every month, Bob will get a secret key corresponding to Bob concatenated with the month: Bob in July, Bob in June, Bob in July, Bob in August.

The identity-based and certificate-based nesting construction using two or more encryption schemes is mathematically secure against quantum computers.

FIG. 3 illustrates a diagram of an embodiment of a second identity-based and certificate-based masking construction using two or more encryption schemes that use the encryption module of a user's device with an identity-based encryption scheme for users of the communication system to encrypt the message and then to mask the resultant product from the identity-based encryption algorithm, and then encrypt the mask value with a second encryption scheme, such as a public key encryption scheme, a symmetric key encryption scheme, etc. in order to create ciphertext that can be transmitted/sent onto the communication system.

In the second identity-based and certificate-based masking construction, Bob's encryption module 110 as the sender encrypts the message μ under the identity-based encryption scheme IBE with an identity-based encryption algorithm IBE.Enc, then scrambles/masks the encryption with a random vector $r \in \mathcal{R}_q^m$, then encrypts the random vector r with public key encryption algorithm PKE.Enc in the public key encryption scheme PKE and then returns the encryption as the concatenation of these to form the ciphertext ct: $(IBE.Enc(id||i, μ, pk_{IBE})+r, PKE.Enc(pk_{PKE}, r))$.

As a recap, the preliminary non-messaging activity occurs similar to the first identity-based and certificate-based masking construction.

Encryption

The identity-based and certificate-based masking construction uses two or more encryption schemes that use the encryption module 110.

The encryption module 110 of a user's device, during a protected messaging phase, creates ciphertext ct. The encryption module 110 on the user's device encrypts the message μ with an identity-based encryption algorithm IBE.Enc to produce the encrypted message to Alice with a first encryption scheme of IBE under the id concatenated with the time period i: e.g., "Alice||562" (id||i). The encryption module 110 encrypts the message μ with an identity-based encryption algorithm IBE.Enc to produce the encrypted message. Then, the encryption module 110 performs another operation to sample a mask value, such as random bits (r), and performs a mathematical operation with the mask value (e.g. XOR) with the random bits on the encrypted message from the identity-based encryption algorithm IBE.Enc to produce the encrypted message as modified by the mask value r. For example, the process generates a random bit value (r) (which is noted for the subsequent decryption) and the encryption module 110 adds the random bit value to the encrypted message in the IBE encryption scheme, and thus masks and/or to blinds the first encryption on the message μ. The encryption module 110 performs the mathematical operation with the mask value r on the encrypted message from the identity-based encryption algorithm IBE.Enc to produce the encrypted message as modified by the mask value. The encryption module 110 is configured to apply an encryption algorithm from a second encryption scheme (e.g. PKE) to the mask value to produce an intermediate encrypted result of the mask value. The encryption module 110 is configured to concatenate i) the intermediate encrypted result of the mask value from the second encryption scheme with ii) the message μ encrypted with the identity-based encryption scheme IBE as modified by the mask value, to create cipher text that can be transmitted/sent onto the communication system. Alternatively, the resultant product of the first encryption with the mask value is then encrypted with a second encryption scheme of PKE by using Bob's public key, and then concatenate the result to create cipher text that can be transmitted/sent. Thus, the encryption algorithm is configured under a first scheme (IBE scheme) to utilize both a message μ to eventually be encrypted and a random vector value $$r \in \mathcal{R}_q^m$$

(mask i) added to OR ii) subtracted from OR iii) other mathematical operation used in conjunction with, the message μ to be eventually be encrypted with the first encryption scheme, and then the random vector value/mask value is encrypted under the second scheme.

For example, the message μ under the identity based key, scrambles the encryption with a random vector $$r \in \mathcal{R}_q^m$$

(mask added to the message) as a first portion of the ciphertext ct, encrypts the random vector r with the public key encryption scheme PKE as a second portion of the ciphertext ct, then returns the encryption as the concatenation of these: (IBE.Enc(id‖i, μ, $pk_{IBE}$)+r, PKE.Enc($pk_{PKE}$, r)).

Thus, the process encrypts the random value R itself with the public key of the other (e.g. PKE) encryption scheme sending both side-by-side not as a single item. The process encrypts the actual R value as a first part of the ciphertext ct. The process encrypts the message μ as a second part of the ciphertext ct. That's why the ciphertext ct now has two components, CT1 and CT2. The cipher text can have multiple components of i) the encrypted mask value encrypted by the second encryption scheme and ii) the encrypted message as modified by the mathematical operation with the mask value, which can be sent both side-by-side. Thus, in essence, a first identity-based encryption scheme IBE encrypts the mask value concatenated with the message μ and then encrypts a separate component of the ciphertext of the mask value itself with a second encryption scheme.

Example Algorithms for the Identity-Based & Certificate-Based Masking Construction Using Two or More Encryption Schemes Let PKE=(PKE.KeyGen, PKE.Enc, PKE.Dec) and IBE= (IBE.Setup, IBE.KeyGen, IBE.Enc, IBE.Dec) be the post-quantum public key and identity-based encryption algorithm IBEs.

CBE Algorithms: CBE2=(IBE.Gen, PKE.Gen, CBE2.Upd, CBE2.Enc, CBE2. Dec) consists of the following algorithms:

For identity-based key generation, IBE. Gen, the certificate authority runs the identity-based encryption scheme IBE. Setup to get (a, $T_a$)←TrapGen(n, m, q) and it sets ($pK_{IBE}$, $sk_{IBE}$, params) as $pk_{IBE}$=a, $sk_{IBE}$=$T_a$ and params as a string describing the ring $\mathcal{R}_q = \mathbb{Z}_q/(x^n+1)$. The certificate authority platform publishes ($pk_{IBE}$, params) and keeps $sk_{IBE}$ secret.

For public key generation algorithm, PKE. Gen, run by the user returns ($pk_{PKE}$, $sk_{PKE}$) where the user publishes $pk_{PKE}$ (and/or sends it to the certificate authority platform) and keeps $sk_{PKE}$ secret.

The update algorithm, CBE2.Upd(id, i, $pk_{PKE}$, $sk_{IBE}$), run by the certificate authority platform first runs the identity-based encryption scheme's key generation on IBE. KeyGen (id‖i, a, $T_a$), where the identity string input is the user's id concatenated with the user's time period/epoch i, to get $cert_{id,i}$=$sk_{id‖i}$ and returns the certificate to the user.

Encryption, CBE2.Enc, to user id during time period/epoch i on message μ is performed by first encrypting a random string $$r \in \mathcal{R}_q^m$$

using the PKE scheme, encrypting the message μ with the IBE encryption scheme, adding the ciphertext with r, then concatenating the resulting ciphertext ct with the PKE encryption of the string. That is, $$r \in \mathcal{R}_q^m$$

is sampled as a random vector over the ring, $ct_1$=PKE.Enc ($pk_{PKE}$, r), $ct_2$=r+IBE.Enc(id‖i, u), and ct=($ct_1$, $ct_2$).

Decryption, CBE2. Dec, by user id during time period/epoch i on ciphertext ct is performed by first decrypting the random string r, r=PKE. Dec($ct_1$, $sk_{PKE}$), then decrypting μ'=IBE.Dec ($ct_2$−r, $cert_{id,i}$).

FIG. 4 illustrates a diagram of an embodiment of a second identity-based and certificate-based masking construction using two or more encryption schemes that use the decryption module of the device to process multiple components of the ciphertext ct.

Bob's device receives the ciphertext ct of the message sent by the other user's device (e.g. Alice). The decryption module 130 of the device of the user (e.g. Bob) processes multiple components of the ciphertext ct. One component of the encrypted message is modified by the masking value r such as a random value, and a second component is the encrypted mask value itself, sent by the device of the second user (e.g. Alice). The decryption module 130 of device of the user applies a public key decryption algorithm PKE.Enc to decrypt the intermediate encrypted result of the mask value under the second encryption scheme, such as the public key encryption scheme PKE. The decryption module 130 applies the first encryption scheme to take as input i) the ciphertext ct and ii) the secret key $sk_{PKE}$ of the public key encryption scheme PKE to compute and decrypt the random value r. Note, in in a symmetric key encryption scheme implementation AES as the second encryption scheme, an symmetric key decryption algorithm AES.Dec would be applied with the symmetric cryptosystem key in the symmetric key encryption scheme AES. Next, the decryption module 130 of the device of the first user undo/reverse the mathematical operation of the mask value r (e.g. random value) applied to the message μ encrypted with the first identity-based scheme to produce a result of merely the encrypted message that was encrypted with the identity-based encryption scheme IBE. Thus, the decryption module 130 then, for example, removes the r random value from the second message by subtracting the r random value from the message in this example. Next, the decryption module 130 applies an identity-based decryption algorithm IBE.Enc to decrypt the encrypted message minus the mask under first identity-based encryption scheme BE to produce an unencrypted version of the message μ itself.

Again, during this decryption process, the validity mechanism ensures validity with the limited-time of validity certificate tied to the user's identity (e.g. Bob//562). Also, the certificate authority platform sent the limited time of validity certificate $cert_{id//i}$ to Bob's validation module 150, which checks the limited time of validity certificate $cert_{id//i}$ valid for time period i against a current time. Note, when the user is not authorized in a time period, they cannot decrypt the received encrypted item during that time. The limited-time of validity certificate $cert_{id//i}$ can be configured i) to contain a secret key tied to the identity of the first user and ii) to validate the first user's right to decrypt the encrypted message during this time period/epoch i. The validation module 150 is configured to check to determine whether the limited time certificate is still valid, and when so, the validation module 150 is configured to supply at least a secret key of an identity-based encryption scheme IBE to the decryption module 130.

The identity-based and certificate-based masking construction using two or more encryption schemes is mathematically secure against quantum computers.

In addition, identity-based and certificate-based masking construction can replace the keys for the message μ with a symmetric cryptosystem's key K used to encrypt and then decrypt the actual message μ.

FIG. 5 illustrates a diagram of an embodiment of a third identity-based and certificate-based symmetric cryptosystem key construction using two or more encryption schemes that use the encryption module of a user's device, during a protected messaging phase to create ciphertext, with a symmetric key encryption scheme to encrypt a message with an symmetric key encryption algorithm to produce the encrypted message coupled with a limited time of validity for the certificate when that the first user can decrypt messages implemented with an identity-based encryption scheme.

The identity-based and certificate-based symmetric cryptosystem key construction can use a double encryption scheme as well as a triple encryption scheme. Under some of the double encryption scheme's coupled with the limited-time of validity certificate $cert_{id//i}$, the design discussed herein can replace the key to encrypt the message μ with a symmetric cryptosystem's key, κ, that was used to encrypt this particular message in both of the previously discussed identity-based and certificate-based constructions (e.g. in FIGS. 2-4). The symmetric cryptosystem key κ used to encrypt the message would also be used to decrypt the message. Next, note, the more encryption schemes employed in general creates two problems of i) a longer/larger amount of bandwidth needed to transmit the encrypted information and computing the two or more encryption schemes takes longer in time and consumes a greater amount of computational processing power to communicate the information securely between the users of the communication system. However, an example efficient triple identity-based and certificate-based symmetric cryptosystem key construction using triple encryption scheme with an AES encryption scheme, as the symmetric key encryption scheme, will be discussed below. Normally, the message and its contained content to be encrypted contains far more data/information to be encrypted than information about a key and/or a masking value.

An example identity-based and certificate-based symmetric cryptosystem key construction using a triple encryption scheme may be as follows.

$$AES(K, \mu)\|r \oplus IBE.Enc(K\ id\|i)\|PKE.Enc(pk, r)$$

Encryption

The example identity-based and certificate-based symmetric key construction using two or more encryption schemes uses the encryption module 110 of a user's device, during a protected messaging phase to create ciphertext, with a symmetric key encryption scheme, such as an AES encryption scheme, to encrypt a message. The combination of AES encryption with the IBE certificate based encryption scheme and masking public key masking scheme and can be a triple encryption. The design can do a triple encryption with a symmetric key from the AES encryption scheme coupled with a limited-time of validity certificate $cert_{id//i}$. Thus, the encryption module 110 is configured to encrypt a message μ with a symmetric key encryption algorithm AES.Enc from a symmetric key encryption scheme ASE, such as the Advanced Encryption Standard encryption scheme, that uses random keys, to produce the encrypted message, which is coupled with the limited-time of validity certificate certian indicating when the first user can decrypt messages implemented with a secret key of an identity-based encryption scheme IBE. Next, the encryption module 110 of the device of the user is configured to perform another operation to sample a random symmetric cryptosystem key, e.g. an AES key, that was used to encrypt the message μ. Next, the encryption module 110 then encrypts that random symmetric cryptosystem key κ as encrypted data with, at least, the first identity-based encryption scheme IBE that uses the limited-time of validity certificate $cert_{id//i}$ tied to an identity of the first user of the communication system. Alternatively, the decryption module 130 samples a random AES key κ used to encrypt the message μ and encrypts that random AES key κ as data in either or both of the public key encryption scheme and the identity-based encryption scheme IBE. In the example show in FIG. 5, the AES key K is encrypted with the identity-based encryption algorithm IBE.Enc and then those resulting bits have a mathematical operation with a masking value r (e.g. random vector value) applied to the encrypted AES key, and the masking value r is encrypted with the PKE encryption scheme. Alternatively, the message itself is encrypted with the AES encryption scheme, the random AES key κ used to encrypt the message is encrypted with identity-based encryption scheme IBE, which the result can then be encrypted with the public key encryption algorithm PKE.Enc. The encryption module 110 is configured to append the encryption of the symmetric cryptosystem key to a front of the encrypted message to create the ciphertext ct that can be sent onto the communication system. This process will roughly double the size of the information about the key size, and, for example, goes from 256 bits to 512 bits. However, an unencrypted message can be, for example, 500 kilobytes.

In each of the variants above, the AES encryption scheme has ciphers that use the same AES key for encrypting and decrypting (and thus, is the equivalent of the public key as well as the secret key in this design). The encryption module 110 of the sender's device and the decryption module 130 of the receiver's device must both know—and use—the same AES key, which is randomly sampled in AES and then the AES key is encrypted and sent to the receiver's device.

As shown in FIG. 5, the encryption module 110 can also execute another operation to sample a masking value of random bits r and perform a mathematical operation with the masking value of random bits r on the encrypted AES key κ and/or the message μ. The encryption module 110 can encrypt the masking value of random bits r with the public key encryption algorithm PKE.Enc and send that as a portion of the ciphertext ct transmitted onto the communication system to the receiver's device.

Thus, in an example, the encryption process does an AES encrypt to the message/data concatenated with an AES key encryption under either or both of the other two encryption schemes with a possible masking. Note, this identity-based and certificate-based symmetric key construction implementing a masking encryption scheme is similar to the random string masking discussed in FIGS. 3 and 4. The encrypted message and resulting ciphertext from this identity-based and certificate-based symmetric key construction implementing a masking encryption scheme may not be as efficient space-wise in an amount of ciphertext needed to be transmitted compared to the other identity-based and certificate-based constructions discussed in FIGS. 2-4, but is more efficient computation-wise. This is because when the encryption module 110 is encrypting a large message, the identity-based encryption scheme IBE and the public key encryption scheme PKE are both very expensive in an amount of computing cycles required. However, the AES encryption scheme is less expensive even when more information needs to be processed because the processing chips and other microprocessors have electronic circuits that do all of the computation in hardware. Also, the identity-based and certificate-based symmetric key construction implementing a masking encryption scheme will be faster in terms of time processing and in terms of computation.

Decryption

FIG. 6 illustrates a diagram of an embodiment of the third identity-based and certificate-based construction using two or more encryption schemes that use the decryption module of a device of the user to process multiple components of the ciphertext, where one component is the encrypted message, and a second component is the encrypted data item of the AES key used to encrypt the message, appended onto the encrypted message, sent by the sender's device/device of another user. Thus, the communication module of the receiver's device receives with the portion of the ciphertext ct of the AES key K potentially either i) masked with a masking value of random bits r or encrypted under the other two schemes (e.g. the identity-based encryption scheme IBE and the public key encryption scheme PKE), and then appended to the front of the AES encryption of the message μ.

An example version of this identity-based and certificate-based symmetric key construction implementing a masking encryption scheme is shown in FIG. 6 as follows.

$$AES(K, \mu)\|r \oplus IBE.Dec(K\ id\|i)\|PKE.Dec(pk, r)$$

The decryption module 130 of the receiver's device applies the public key decryption algorithm PKE. Dec via use of the public key PK.PKE to the encrypted masking value of random bits in order to obtain the unencrypted masking value r. The decryption module 130 then uses those resulting bits to undo the mathematical operation of the masking value r applied to the random AES key encrypted with the identity-based encryption algorithm IBE.Enc in FIG. 5. For example, the masking value of random bits may have been subtracted out of the random AES key encrypted with the identity-based encryption algorithm IBE.Enc. The decryption module 130 of the device of the first user is configured to i) use a secret key tied to the identity of the first user from the first identity-based encryption scheme IBE and ii) apply an identity-based decryption algorithm IBE.Dec from the first identity-based encryption scheme IBE to decrypt the encrypted data item of the AES key K used to encrypt the message. This produces the unencrypted random AES key K shown in FIG. 6 (and used to initial encrypt with from FIG. 5). The validation module 150 cooperates with the limited-time of validity certificate cert$_{id//i}$ issued by the identity-based key generator that acts as the certificate authority granting users validation to allow the decryption of the encrypted data item of the AES key K. The validity mechanism references the limited-time of validity certificate cert$_{id//i}$ corresponding to this specific user's identity id to check whether the limited-time of validity certificate cert$_{id//i}$ and associated secret key are still valid. If so, the unencrypted random AES key K used to encrypt with is then supplied to the symmetric key decryption scheme AES to apply an, e.g. an AES decryption algorithm AES.Dec to decrypt the encrypted message. Thus, the decryption module 130 can then use the AES key K and an AES decryption algorithm to decrypt the encrypted message AES.Dec to produce message μ.

Network

FIG. 7 illustrates a diagram of a number of electronic systems and devices communicating with each other in a network environment in accordance with an embodiment of the certificate-based encryption implemented with two or more encryption schemes. The network environment 800 has an example communications network 820 for the communication system. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. Thus, any combination of server computing systems and client computing systems may connect to each other via the communications network 820.

The system containing the Artificial Intelligence engine 100 can use a network like this to supply training data to create and train a machine learning network. Any of the devices and other components in the example identity-based and certificate-based constructions can reside and be implemented in this network environment. For example, in the cloud platform of server 804A and database 806A can implement the certificate authority platform that contains an identity-based key generator that grants users of the communication system validation to decrypt messages via a limited-time of validity certificate certid//i corresponding to that particular user's identity id issued from the certificate authority platform.

The identity-based key generator uses an identity-based encryption scheme IBE. The identity-based key generation algorithm generates the secret key for each user based on their identity.

A plurality of instances of public-secret key pair generators can exist in the communication system. Each public-secret key pair generator resident on its own device of the users of the communication system, such as a local server 804B and database 806B, a desktop computer 802H, on a mobile computing device such as laptop 802B, a first smartphone 802A a second smartphone 802E, a first wearable electronic device 802C, in a smart system such as smart vehicle 802D, a virtual reality or augmented reality headset 804C, etc., and other similar platforms. The public-secret key pair generators implement a second encryption scheme, such as a symmetric key encryption scheme AES, public key encryption scheme PKE, etc. An encryption module of a device of the user applies aspects of both encryption schemes to ciphertext ct, including messages, communicated between the devices of the users of the communication system including a secret key from the second encryption scheme. Again, a randomly generated symmetric cryptosystem key functions as both a public key to encrypt the message μ to be transmitted and a secret key to decrypt received ciphertext ct. An instance of a secret key generated by each public-secret key pair generator is not sent or in any other way communicated to the certificate authority platform so that the certificate authority platform does not have any ability to decrypt the messages communicated between the users of the communication system.

A validation module on each device of each user of the communication system is configured to allow a decryption module on a device of that user to decrypt the encrypted message with the limited-time of validity certificate when that user is validated during that time period. Note, a portion of the validation module can also be implemented on the certificate authority platform. The identity-based key generator and the validation module are configured to cooperate to designate that the particular user can legitimately use an identity-based key in the limited-time of validity certificate $cert_{id//i}$ to unencrypt during its designated time period/epoch i. Thus, the identity-based key generator acting as the certificate authority grant each user their validation and cooperates with the certificate authority platform to send each validated user the limited-time of validity certificate $cert_{id//i}$ corresponding to that particular user's identity id and the time period i when that certificate is valid. Note, a formerly valid limited-time of validity certificate $cert_{id//i}$ becomes invalidated after the designated time period i and a formerly valid user becomes invalidated after the designated time period. The validation module checks whether a user's device is valid to decrypt the encrypted message with the limited-time of validity certificate $cert_{id//i}$ when they are validated for that time period. A formerly valid user becomes invalidated after the designated time period.

Note, the second encryption scheme, such as a symmetric key encryption scheme AES is independent from and different than the identity-based encryption scheme IBE, implemented in the certificate authority platform.

For example, all of these user devices, e.g. a local server 804B and database 806B, on a device such as laptop 802B, in a smart system such as smart automobile 802D, and other similar platforms, can communicate ciphertext ct between each other.

The communications network 820 can connect one or more server computing systems selected from at least a first server computing system 804A and a second server computing system 804B to each other and to at least one or more client computing systems as well. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

Examples of the client computing systems can include a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., a laptop computer), a third mobile computing device 802F (e.g., tablet with an Android- or iOS-based operating system), a smart device or system incorporated into a first smart vehicle 802D, a smart IoT device, or system incorporated into a first smart bicycle, a first smart television 802H, a first virtual reality or augmented reality headset 804C, and the like. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820. Server 804B may send, for example, simulator data to server 804A.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser-based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component or direct application component, a content management component, and a database management component. The server engine can perform basic processing and operating-system level tasks. The web page management component can handle creation and display or routing of web pages or screens associated with receiving and providing digital content and digital advertisements, through a browser. Likewise, the direct application component may work with a client app resident on a user's device. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In an embodiment, a server computing system can be configured to display information in a window, a web page, or the like. An application including any program modules, applications, services, processes, and other similar software executable when executed on, for example, the server computing system 804A, can cause the server computing system

804A to display windows and user interface screens in a portion of a display screen space.

Each application has a code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow entry of details.

Computing Systems

FIG. 8 illustrates a diagram of an embodiment of one or more computing devices that can be a part of the systems associated with the certificate-based encryption implemented with two or more encryption schemes discussed herein.

The components of the user's device and/or the certificate authority platforms can be implemented with various parts of a computing device. The computing device 900 may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), and a built-in battery to power the computing device, an AC power input to charge the battery, a display screen, and a built-in Wi-Fi circuitry to wirelessly communicate with a remote computing device connected to the network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, Python, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in a portion of a memory and is executed by one or more processors. In an embodiment, a module can be implemented in electronic hardware such as logic and other electronic components to perform the functions discussed for that module, software as a block of executable code coded to perform the functions discussed for that module, and/or a combination of software cooperating with electronic hardware.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A certificate-based encryption apparatus, comprising:
an encryption module on a device of a first user configured to encrypt a message;
  a decryption module on the device of the first user;
  a validation module on the device of the first user;
  where the encryption module and the decryption module are configured to cooperate with an identity-based key generator of users in a communication system in order to use an identity-based and certificate-based construction using two or more encryption schemes with an encrypted message communicated between users of the communication system such that the encrypted message received by the device of the first user needs keys from each of the two or more encryption schemes to be able to decrypt the encrypted message;
  where the validation module is configured to cooperate with a limited-time of validity certificate issued from a certificate authority platform to decrypt the encrypted message via the limited-time of validity certificate, where the validation module is further configured to allow the decryption module to decrypt the encrypted message with the limited-time of validity certificate, corresponding to an identity of the first user, when the first user is verified to be within a period of time specified for the limited-time of validity certificate;
  where the limited-time of validity certificate is configured to indicate a secret key of an identity-based encryption scheme tied to the identity of the first user;

where the validation module is further configured to reference the limited-time of validity certificate to confirm i) the identity of the first user tied to the secret key of the identity-based encryption scheme and ii) a current time period of validity for the limited- time of validity certificate is within a time period indicated by the limited-time of validity certificate; and where algorithms of the encryption module, the decryption module, and the validation module are implemented in hardware electronic components, in software stored in one or more non-transitory machine-readable mediums to be executed by one or more processors, and any combination of both.

2. The certificate-based encryption apparatus of claim 1, where the encryption module is configured to create ciphertext, where the encryption module is configured to use an identity-based encryption scheme to encrypt the message with an identity-based encryption algorithm to produce encrypted data; and then, the encryption module is configured to perform another operation on the encrypted data such that the encryption module uses a second encryption scheme to apply a second encryption algorithm to encrypt the encrypted data in order to create the ciphertext of the encrypted message that can be transmitted onto the communication system.

3. The certificate-based encryption apparatus of claim 2, where the second encryption scheme is a public key encryption scheme and the second encryption algorithm is a public key encryption algorithm; and where the decryption module of the device of the first user is configured to process the ciphertext of the encrypted message sent by a device of another user;

where the decryption module of the device of the first user is configured to apply a public key decryption algorithm to decrypt the ciphertext sent over the communication system to produce an intermediate decryption result, and then the decryption module is configured to perform another operation where the decryption module is configured to use the secret key of the identity-based encryption scheme to decrypt the resultant product of the encrypted message decrypted from the public key encryption scheme, in order to produce an unencrypted version of the message.

4. The certificate-based encryption apparatus of claim 1, where the encryption module is configured to create ciphertext, where the encryption module is configured i) to use an identity-based encryption scheme to encrypt the message with the identity-based encryption algorithm to produce the encrypted message, and then the encryption module is configured ii) to execute another operation to sample a mask value and perform a mathematical operation with the mask value on the encrypted message from the identity-based encryption scheme to produce the encrypted message as modified by the mask value;

where the encryption module is configured to apply an encryption algorithm from a second encryption scheme to the mask value to produce an intermediate encrypted result of the mask value; and where the encryption module is configured to concatenate i) the intermediate encrypted result of the mask value from the second encryption scheme with ii) the encrypted message as modified by the mask value, to create the ciphertext that can be transmitted onto the communication system.

5. The certificate-based encryption apparatus of claim 4, where the two or more encryption schemes at least include a public key encryption scheme and the identity-based encryption scheme;

where the decryption module of the device of the first user is configured to process multiple components of ciphertext sent by a device of another user, where one component indicates the mask value itself encrypted with the public key encryption scheme, and a second component indicates the encrypted message as modified by the mask value;

where the decryption module is configured to apply a public key decryption algorithm and use a secret key of the public key encryption scheme to decrypt the intermediate encrypted result of the mask value, where the decryption module of the device of the first user is configured to undo the mathematical operation of the mask value applied to the encrypted message with the identity-based encryption scheme to produce an intermediate decrypted result of the encrypted message; and where next the decryption module is configured to apply an identity-based decryption algorithm and use the secret key of the identity-based key encryption scheme to decrypt the encrypted message in order to produce an unencrypted version of the message.

6. The certificate-based encryption apparatus of claim 1, where the certificate authority platform is configured to grant the users validation and has the identity-based key generator, where the certificate authority platform and the identity-based key generator are configured to act as a certificate authority that grant users of the communication system validation;

where the validation module is configured to cooperate with the limited-time of validity certificate from the certificate authority platform to decrypt the message, where the identity-based key generator is configured to use an identity-based encryption scheme to produce i) a published key to encrypt items and ii) the limited-time of validity certificate corresponding to the first user's identity; and where the limited-time of validity certificate is configured i) to contain a secret key tied to the identity of the first user and ii) to validate the first user's right to decrypt the encrypted message, where the identity-based key generator and the validity module are configured to cooperate through the limited-time of validity certificate to designate that the first user can legitimately use the secret key of the identity-based encryption scheme to decrypt the encrypted message by the validity module checking that the limited-time of validity certificate is valid for its specified period of time for that first user.

7. The certificate-based encryption apparatus of claim 1, where the encryption module is configured to create ciphertext, where the encryption module is configured to encrypt the encrypted message with a symmetric key encryption algorithm from a symmetric key encryption scheme to produce the encrypted message, which is then coupled with the limited-time of validity certificate indicating when the first user can decrypt messages implemented with the secret key of an identity-based encryption scheme;

where the encryption module is configured to then perform another operation to sample a random symmetric cryptosystem key that was used to encrypt the message, and then to encrypt the random symmetric cryptosystem key with, at least, the identity- based encryption scheme; and where the encryption module is configured to append the encryption of the symmetric cryptosystem key to the encrypted message to create the ciphertext that can be sent onto the communication system.

8. The certificate-based encryption apparatus of claim 7, where the symmetric key encryption scheme is an AES and the random symmetric cryptosystem key is an AES key;

where the decryption module is configured to process multiple components of the ciphertext, where one component is the encrypted message and a second component is an intermediate encrypted result of the AES key used to encrypt the message, appended onto the encrypted message, sent by a device of a second user;

where the decryption module is configured to i) use the secret key tied to the identity of the first user from the identity-based encryption scheme and ii) apply an identity-based decryption algorithm from the identity-based encryption scheme to decrypt the intermediate encrypted result of the AES key used to encrypt the message; and where the decryption module is configured to then use the AES key and an AES decryption algorithm to decrypt the encrypted message.

9. The certificate-based encryption apparatus of claim 1, where the limited-time of validity certificate is configured to contain the secret key tied to the identity of the first user and the time period of when the first user is validated;

where the decryption module, the validation module, and the limited-time of validity certificate are configured to cooperate to require the need for the keys from each of the two or more encryption schemes to be able to decrypt the encrypted message, in order to make each identity-based and certificate-based construction using the two or more encryption schemes safe from an attack from a quantum computer; and where the validation module is further configured to check to determine whether the limited-time of validity certificate is still valid, and if it is, the validation module is configured to supply the secret key of the identity-based encryption scheme to the decryption module.

10. The certificate-based encryption apparatus of claim 1, wherein the two or more encryption schemes that are implemented are individually quantum safe; and thus, a result of combining these two or more encryption schemes with the limited-time of validity certificate results in the certificate-based encryption apparatus being quantum safe.

11. A method for a certificate-based encryption system, comprising:

configuring an encryption module on a device of a first user encrypt a message;

configuring the encryption module and a decryption module to cooperate with an identity-based key generator of users in a communication system in order to use an identity-based and certificate-based construction using two or more encryption schemes with an encrypted message communicated between users of the communication system such that the encrypted message received by the device of the first user needs keys from each of the two or more encryption schemes to be able to decrypt the encrypted message;

configuring a validation module on the device of the first user to cooperate with a limited-time of validity certificate issued from a certificate authority platform to decrypt the encrypted message via the limited-time of validity certificate, where the validation module is further configured to allow the decryption module to decrypt the encrypted message with the limited-time of validity certificate, corresponding to an identity of the first user, when the first user is determined to be actually validated for a period of time specified for the limited-time of validity certificate;

configuring the limited-time of validity certificate to indicate a secret key of an identity-based encryption scheme tied to an identity of the first user; and configuring the validation module to reference the limited-time of validity certificate to confirm i) the identity of the first user tied to the secret key of the identity-based encryption scheme and ii) a current time period of validity for the limited-time of validity certificate is within a time period indicated by the limited-time of validity certificate.

12. The method for the certificate-based encryption system of claim 11, further comprising:

configuring the encryption module to create ciphertext, where the encryption module is configured to use an identity-based encryption scheme to encrypt the message with an identity-based encryption algorithm to produce encrypted data; and then, the encryption module is configured to perform another operation on the encrypted data such that the encryption module uses a second encryption scheme to apply a second encryption algorithm to encrypt the encrypted data in order to create the ciphertext of the encrypted message that can be transmitted onto the communication system.

13. The method for the certificate-based encryption system of claim 12, further comprising:

where the second encryption scheme is a public key encryption scheme and the second encryption algorithm is a public key encryption algorithm; and configuring the decryption module of the device of the first user to process the ciphertext of the encrypted message sent by a device of another user;

configuring the decryption module of the device of the first user to apply a public key decryption algorithm to decrypt the ciphertext sent over the communication system to produce an intermediate decryption result, and then the decryption module to perform another operation where the decryption module uses the secret key of the identity-based encryption scheme to decrypt the resultant product of the encrypted message decrypted from the public key encryption scheme, in order to produce an unencrypted version of the message.

14. The method for the certificate-based encryption system of claim 11, further comprising:

configuring the encryption module to create ciphertext, where the encryption module is configured i) to use an identity-based encryption scheme to encrypt the message with an identity-based encryption algorithm to produce the encrypted message, and then ii) to execute another operation to sample a mask value and to perform a mathematical operation with the mask value on the encrypted message from the identity-based encryption scheme to produce the encrypted message as modified by the mask value;

configuring the encryption module to apply an encryption algorithm from a second encryption scheme to the mask value to produce an intermediate encrypted result of the mask value; and configuring the encryption module to concatenate i) the intermediate encrypted result of the mask value from the second encryption scheme with ii) the encrypted the message as modified by the mask value, to create the ciphertext that can be transmitted onto the communication system.

15. The method for the certificate-based encryption system of claim 14, further comprising:

where the two or more encryption schemes at least include a public key encryption scheme and the identity-based encryption scheme; and configuring the decryption module of the device of the first user to process multiple components of ciphertext sent by a device of another user, where one component indicates the mask value itself encrypted with the public key encryption scheme, and a second component indicates the encrypted message as modified by the mask value;

configuring the decryption module to apply a public key decryption algorithm and use a secret key of the public key encryption scheme to decrypt the intermediate encrypted result of the mask value, where the decryption module of the device of the first user is configured to undo the mathematical operation of the mask value applied to the encrypted message with the identity-based encryption scheme to produce a result of merely the encrypted message; and configuring the decryption module to apply an identity-based decryption algorithm and use the secret key of the identity-based key encryption scheme to decrypt the encrypted message in order to produce an unencrypted version of the message.

16. The method for the certificate-based encryption system of claim 11, further comprising:

configuring the certificate authority platform to grant the users validation and has the identity-based key generator;

configuring the certificate authority platform and the identity-based key generator to act as a certificate authority that grant users of the communication system validation;

configuring the validation module to cooperate with the limited-time of validity certificate from the certificate authority platform to decrypt the message, where the identity-based key generator is configured to use an identity-based encryption scheme to produce i) a published key to encrypt items and ii) the limited-time of validity certificate corresponding to the first user's identity; and configuring the limited-time of validity certificate i) to contain a secret key tied to the identity of the first user and ii) to validate the first user's right to decrypt the encrypted message, where the identity-based key generator and the validity module are configured to cooperate through the limited-time of validity certificate to designate that the first user can legitimately use the secret key of the identity-based encryption scheme to decrypt the encrypted message by the validity module checking that the limited-time of validity certificate is valid for its specified period of time for that first user.

17. The method for the certificate-based encryption system of claim 11, further comprising:

configuring the encryption module to create ciphertext, where the encryption module is configured to encrypt the encrypted message with a symmetric key encryption algorithm from a symmetric key encryption scheme to produce the encrypted message, which is then coupled with the limited-time of validity certificate indicating when the first user can decrypt messages implemented with the secret key of an identity-based encryption scheme;

configuring the encryption module to then perform another operation to sample a random symmetric cryptosystem key that was used to encrypt the message, and then to encrypt the random symmetric cryptosystem key with, at least, the identity-based encryption scheme; and configuring the encryption module to append the encryption of the symmetric cryptosystem key to the encrypted message to create the ciphertext that can be sent onto the communication system.

18. The method for the certificate-based encryption system of claim 17, further comprising:

where the symmetric key encryption scheme is an AES and the random symmetric cryptosystem key is an AES key;

configuring the decryption module to process multiple components of the ciphertext, where one component is the encrypted message and a second component is an intermediate encrypted result of the AES key used to encrypt the message, appended onto the encrypted message, sent by a device of a second user;

configuring the decryption module to i) use the secret key tied to the identity of the first user from the identity-based encryption scheme and ii) apply an identity-based decryption algorithm from the identity-based encryption scheme to decrypt the intermediate encrypted result of the AES key used to encrypt the message; and configuring the decryption module is configured to then use the AES key and an AES decryption algorithm to decrypt the encrypted message.

19. The method for the certificate-based encryption system of claim 11, further comprising:

configuring the limited-time of validity certificate to contain the secret key tied to the identity of the first user and the time period of when the first user is validated;

configuring the decryption module, the validation module, and the limited-time of validity certificate to cooperate to require the need for the keys from each of the two or more encryption schemes to be able to decrypt the encrypted message, in order to make each identity-based and certificate-based construction using the two or more encryption schemes safe from being hacked by an attack from a quantum computer; and configuring the validation module to check to determine whether the limited-time of validity certificate is still valid, and when so, the validation module is configured to supply the secret key of the identity-based encryption scheme to the decryption module.

20. The method for the certificate-based encryption system of claim 11, further comprising:

using the two or more encryption schemes that are individually quantum safe; and thus, as a result of combining these two or more encryption schemes with the limited-time of validity certificate that results in the certificate-based encryption system being quantum safe.

21. A non-transitory computer-readable medium including executable instructions that, when executed with one or more processors, cause a computing device to perform operations as follows, comprising:

causing an encryption module and a decryption module to cooperate with an identity-based key generator of users in a communication system in order to use an identity-based and certificate-based construction using two or more encryption schemes with an encrypted message communicated between users of the communication system such that the encrypted message received by the device of a first user needs keys from each of the two or more encryption schemes to be able to decrypt the encrypted message;

causing a validation module on the device of the first user to cooperate with a limited-time of validity certificate issued from a certificate authority platform to decrypt the encrypted message via the limited-time of validity certificate, where the validation module is further configured to allow the decryption module to decrypt the encrypted message with the limited-time of validity certificate, corresponding to an identity of the first user, when the first user is determined to be actually validated for a period of time specified for the limited-time of validity certificate; and causing the limited-time of validity certificate to indicate a secret key of an identity-based encryption scheme tied to an identity of the first user;

causing the validation module to reference the limited-time of validity certificate to confirm i) the identity of the first user tied the secret key of the identity-based encryption scheme and ii) a current time period of validity for the limited-time of validity certificate is within a time period indicated by the limited-time of validity certificate; and causing the certificate authority platform to grant the first user's validation and use the identity-based key generator.

22. A system, comprising:

a certificate authority platform including an identity-based key generator configured to grant users of a communication system validation to decrypt messages via a limited-time of validity certificate corresponding to that particular user's identity issued from the certificate authority platform, where a validation module on each device of each user of the communication system is configured to allow a decryption module on a device of that user to decrypt an encrypted message with the limited-time of validity certificate when that user is validated during that time period, where the limited-time of validity certificate is configured to indicate a secret key of an identity-based encryption scheme tied to an identity of the first user; where the validation module is further configured to reference the limited-time of validity certificate to confirm i) the identity of the first user tied to the secret key of the identity-based encryption scheme and ii) a current time period of validity for the limited-time of validity certificate is within a time period indicated by the limited-time of validity certificate, where the identity-based key generator uses an identity-based encryption scheme, where the identity-based key generator and the validation module are configured to cooperate to designate that the particular user can legitimately use an identity-based key in the limited-time of validity certificate to unencrypt during its designated time period; and thus, the identity-based key generator is configured to act as the certificate authority that grants a first user validation, where the identity-based key generator is configured to cooperate with the certificate authority platform to send each validated user the limited-time of validity certificate corresponding to that particular user's identity and the time period when that certificate is valid, where a formerly valid limited-time of validity certificate becomes invalidated after the designated time period and a formerly valid user becomes invalidated after the designated time period, a plurality of instances of public-secret key pair generators, each resident on its own device of the users of the communication system, where the public-secret key pair generators are configured to implement a second encryption scheme, where an encryption module of the device of the first user is configured to apply aspects of both encryption schemes to ciphertext, including messages, communicated between the devices of the users of the communication system, where an instance of a secret key generated by each public-secret key pair generator is not sent or in any other way communicated to the certificate authority platform so that the certificate authority platform does not have any ability to decrypt the messages communicated between the users of the communication system, where the second encryption scheme is independent from and different than the identity-based encryption scheme, where the validation module is configured to check whether the first user's device is valid to decrypt the encrypted message with the limited-time of validity certificate when they are validated for that time period; and where algorithms of the identity-based key generator, the encryption module, the decryption module, the public-secret key pair generators, and the validation module are implemented in hardware electronic components, in software stored in one or more non-transitory machine-readable mediums to be executed by one or more processors, and any combination of both.

* * * * *